United States Patent
Christie et al.

(10) Patent No.: US 9,543,589 B2
(45) Date of Patent: Jan. 10, 2017

(54) LEAD-ACID BATTERY CONSTRUCTION

(71) Applicant: Arcactive Limited, Christchurch (NZ)

(72) Inventors: Shane Christie, Christchurch (NZ); Yoon San Wong, Christchurch (NZ); Grigory Titelman, Christchurch (NZ); John Abrahamson, Christchurch (NZ)

(73) Assignee: ARCACTIVE LIMITED, Christchurch (NZ)

( * ) Notice: Subject to any disclaimer, the term of this patent is extended or adjusted under 35 U.S.C. 154(b) by 0 days.

(21) Appl. No.: 14/383,659

(22) PCT Filed: Mar. 8, 2013

(86) PCT No.: PCT/NZ2013/000031
§ 371 (c)(1),
(2) Date: Sep. 8, 2014

(87) PCT Pub. No.: WO2013/133724
PCT Pub. Date: Sep. 12, 2013

(65) Prior Publication Data
US 2015/0017545 A1   Jan. 15, 2015

Related U.S. Application Data

(60) Provisional application No. 61/608,259, filed on Mar. 8, 2012, provisional application No. 61/667,626, filed on Jul. 3, 2012.

(51) Int. Cl.
*H01M 4/80* (2006.01)
*H01M 4/13* (2010.01)
(Continued)

(52) U.S. Cl.
CPC ............... *H01M 4/663* (2013.01); *H01M 4/14* (2013.01); *H01M 4/20* (2013.01); *H01M 4/364* (2013.01); *H01M 4/62* (2013.01); *H01M 4/628* (2013.01); *H01M 4/667* (2013.01); *H01M 4/68* (2013.01); *H01M 4/73* (2013.01); *H01M 10/06* (2013.01); *H01M 4/0416* (2013.01); *H01M 4/0445* (2013.01); *H01M 4/627* (2013.01); *H01M 2004/021* (2013.01); *H01M 2220/20* (2013.01); *Y02E 60/126* (2013.01); *Y02P 70/54* (2015.11)

(58) Field of Classification Search
CPC .......... H01M 4/663; H01M 4/56; H01M 4/73; H01M 4/74
USPC .................................. 429/225, 212, 226, 233
See application file for complete search history.

(56) References Cited

U.S. PATENT DOCUMENTS

| 4,342,343 A | 8/1982 | Clague et al. |
| 4,429,442 A | 2/1984 | Thomas |

(Continued)

FOREIGN PATENT DOCUMENTS

| GB | 1393528 | 5/1975 |
| JP | 03285263 | 12/1991 |

(Continued)

*Primary Examiner* — Patrick Ryan
*Assistant Examiner* — Julian Anthony
(74) *Attorney, Agent, or Firm* — Dann Dorfman Herrell and Skillman

(57) ABSTRACT

Batteries comprise a carbon fiber electrode construction of the invention and have improved DCA and/or CCA, and/or may maintain DCA with an increasing number of charge-discharge cycles, and thus may be particularly suitable for use in hybrid vehicles.

17 Claims, 16 Drawing Sheets

(51) Int. Cl.
  *H01M 4/60* (2006.01)
  *H01M 4/36* (2006.01)
  *H01M 4/64* (2006.01)
  *H01M 4/72* (2006.01)
  *H01M 4/66* (2006.01)
  *H01M 4/14* (2006.01)
  *H01M 4/20* (2006.01)
  *H01M 4/62* (2006.01)
  *H01M 4/68* (2006.01)
  *H01M 4/73* (2006.01)
  *H01M 10/06* (2006.01)
  *H01M 4/04* (2006.01)
  *H01M 4/02* (2006.01)

(56) References Cited

U.S. PATENT DOCUMENTS

| | | | |
|---|---|---|---|
| 5,156,935 A | 10/1992 | Hohjo et al. | |
| 5,434,025 A * | 7/1995 | Rao | C22C 11/06 429/226 |
| 6,316,148 B1 | 11/2001 | Timmons et al. | |
| 6,372,192 B1 | 4/2002 | Paulauskas et al. | |
| 6,617,071 B2 | 9/2003 | Chen et al. | |
| 6,733,547 B2 | 5/2004 | Ma | |
| 7,569,514 B2 | 8/2009 | Adrianov et al. | |
| 2003/0175203 A1 | 9/2003 | Nitsche et al. | |
| 2006/0292448 A1 | 12/2006 | Gyenge et al. | |
| 2009/0233175 A1* | 9/2009 | Kelley | H01M 2/28 429/225 |
| 2009/0269666 A1 | 10/2009 | Lara-Curzio et al. | |

FOREIGN PATENT DOCUMENTS

| | | |
|---|---|---|
| WO | 2006105186 | 10/2006 |
| WO | 2008070914 | 6/2008 |
| WO | 2010027451 | 3/2010 |
| WO | 2010062203 | 6/2010 |
| WO | 2010098796 | 9/2010 |
| WO | 2011029130 | 3/2011 |
| WO | 2011078707 | 6/2011 |

* cited by examiner

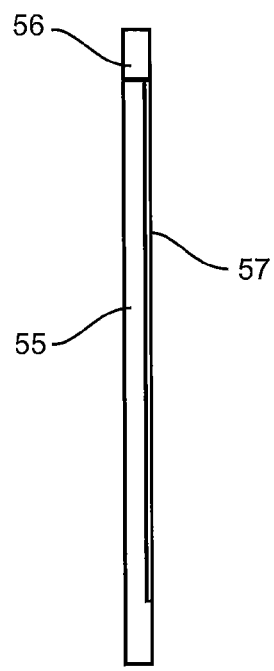
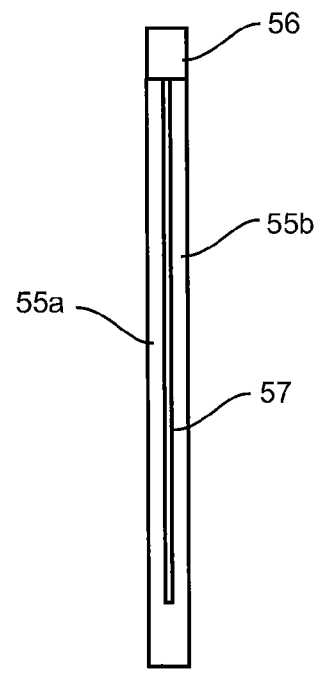
FIGURE 5  FIGURE 6
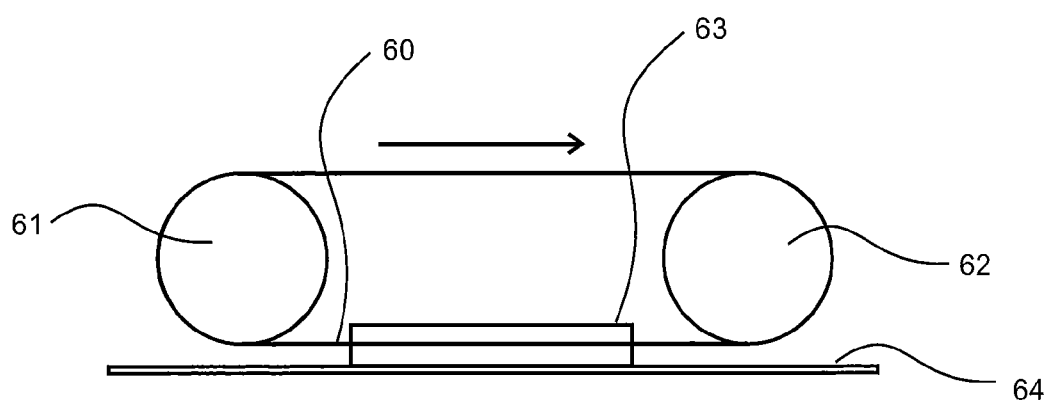
FIGURE 7

LEAD-ACID BATTERY CONSTRUCTION

CROSS REFERENCE TO RELATED APPLICATION

This application claims the benefit of U.S. Provisional Application No. 61/608,259, filed Mar. 8, 2012 and U.S. Provisional Application No. 61/667,626, filed Jul. 3, 2012.

FIELD OF THE INVENTION

The invention relates to an improved battery construction for lead-acid batteries particularly but not exclusively automotive batteries for hybrid vehicles.

BACKGROUND

A Pb-acid battery stores and releases energy by electrochemical reaction(s) at the surfaces of its electrodes. Each cell in the fully charged state contains electrodes of elemental lead (Pb) and lead (IV) dioxide ($PbO_2$) in an electrolyte of dilute sulfuric acid ($H_2SO_4$). In the discharged state both electrodes turn into lead (II) sulfate ($PbSO_4$) and the electrolyte loses its dissolved sulfuric acid and becomes primarily water. In the pasted-plate construction each plate consists of a lead grid initially filled with a paste comprising a mixture of leady oxide (Pb and PbO) and dilute sulfuric acid. This construction allows the acid in the paste to react with the leady oxide inside the plate during cell formation (first charge and discharge cycle during which linkages occur between neighbouring particles), increasing the electrical conductivity and active surface area and thus the battery capacity. The paste may also contain carbon black, blanc fixe (fine barium sulfate), and lignosulfonate.

Vehicle hybridisation driven by increasing worldwide demand for lower automotive emissions and/or increased fuel economy places increased demand on vehicle batteries, which are most commonly Pb-acid batteries. For example the European Union has set a long-term emissions target of not more than 95 g carbon dioxide/km to be reached by 2020 for new vehicles.

Many new internal combustion engine (petrol, diesel, or gas) powered vehicles also have idle elimination functionality—the engine is arranged to switch off when the vehicle is stationary or travelling at low speed. Such vehicles are referred to as stop-start vehicles or micro-hybrid vehicles. Each engine restart draws energy from the battery and if this occurs more quickly than energy can be replaced by recharging, during only relatively short engine on periods in commuter traffic for example, the battery charge (or state of charge) will not be maintained. Current is also drawn from the battery during periods in which the vehicle engine is off to maintain other functionalities in the vehicle such as air-conditioning, radio etc (referred to as "hotel loads"). Battery charge may fall sufficiently that the vehicle battery management system will then override the idle elimination functionality to prevent any further engine stop-starts until the battery's state of charge has recovered. Thus to maintain battery charge in even for example heavy commuter traffic a battery for such a stop-start or micro-hybrid vehicle should have a high dynamic charge acceptance (DCA) rate, which refers to the rate at which a battery will accept charge.

Vehicles with a higher level of hybridisation including vehicles comprising both an internal combustion engine and an electric motor typically comprise regenerative braking, in which braking force is applied by a generator the electric energy from which is stored in the vehicle battery. The vehicle battery is charged only by current from regenerative braking during time periods in which the internal combustion engine which also drives a generator (which here includes alternator) is not operating. Under regenerative braking relatively high charging currents are supplied to the vehicle battery for short time periods and thus batteries for hybrid vehicles with regenerative braking should also have high DCA. Full electric vehicles also comprise regenerative braking.

The charging system of a hybrid vehicle is arranged to use the engine-driven generator to maintain the charge state of the vehicle battery at less than full charge such as for example at about 80% charge, so that there is generally capacity available to accept additional charging energy from regenerative braking. However the battery DCA then typically declines over time with increasing number of discharge and charge (to less than full charge) cycles, with AGM batteries typically operating at around 0.1 to 0.3 A/Ah (or 0.1 to 0.3 C) within a few thousand cycles. This loss in charge acceptance reduces the fuel saving capability of the vehicle; automakers ideally want a battery that can accept up to 2 A/ah, or even 3 A/Ah over a 5 to 10 second period to maximise the fuel saving potential of the start/stop and regenerative braking functions. However, any improvement above the 0.1 to 0.3 A/Ah is a valuable improvement. Typically the charging system of a hybrid vehicle is arranged to allow the battery to discharge and then (using the engine-driven generator to) charge the battery. Generally, the cars Battery Management System will periodically fully charge the battery (or "recondition" the battery) to restore the battery DCA, such as every three months. An ideal Pb-acid battery, particularly for a hybrid vehicle, would maintain DCA without requiring periodic full charging, or at least would maintain a higher rate of DCA between reconditioning cycles.

In a Pb-acid battery DCA is primarily determined by the charging reaction at the negative electrode.

A battery should also meet other requirements, such as have high volumetric energy density. Volumetric energy density (VED) refers to the energy supplied per unit volume of electrode. A closed Pb-acid battery system should also have low water consumption. And an automotive battery in particular should be able to deliver high current for engine starting, at low temperature. A cold cranking amps (CCA) test tests the ability of a battery to do so.

U.S. Pat. No. 7,569,514 describes utilising activated carbon as an electrode in an absorbed glass mat battery to overcome sulphation to thereby increase the dynamic charge acceptance of the battery.

U.S. Pat. No. 4,429,442 describes a lead-acid battery plate comprising a metal grid and active mass and a layer of carbon fibrous material on the side of the active mass to enhance mechanical integrity of the active mass.

U.S. Pat. No. 4,342,343 describes a negative lead-acid storage battery plate with interconnected carbon fibres over the face of a pasted plate. During manufacture formability is enhanced by securing the fibres to a paper carrier and then pressing the same to the plate.

U.S. Pat. No. 6,617,071 describes an electrode having a conductive polymeric matrix formed over the surface of a grid plate where the conductive polymeric matrix comprises superfine or nanoscale particles of active material.

Our international patent application publication WO2011/078707 discloses a lead-acid battery comprising as a current collector a conductive fibrous material of filaments with low interfibre spacing and conducting chains of Pb-based particles attached to the fibres, which provides improved battery performance particularly DCA.

SUMMARY OF INVENTION

It is an object of at least some embodiments of the invention to provide improved or at least alternative electrodes and/or cells and/or batteries particularly but not necessarily exclusively suitable for use in hybrid vehicles, and/or methods for manufacturing same.

In broad terms in one aspect the invention comprises a lead-acid battery or cell including at least one (non-composite or composite) electrode comprising as a current collector a conductive fibrous material comprising, when fully charged, voidage (being the fractional volume occupied by the pores between the lead and conductive fibres) of between about at least about 0.3, and a mass loading ratio of lead (in whatever form) to the mass of conductive fibres, when converted to volume ratio, in the range about 0.7:1 or about 1:1 to about 15:1 or about 10:1 (each over at least a major fraction of the electrode and more preferably over substantially all of the electrode).

In broad terms in another aspect the invention comprises a method for manufacturing a lead-acid battery or cell which includes forming at least one (non-composite or composite) electrode comprising as current collector a conductive fibrous material comprising when fully charged, voidage (being the fractional volume occupied by the pores between the lead and conductive fibres) of at least about 0.3, and, a mass loading ratio of lead to the mass of conductive fibres, when converted to volume ratio in the range about 0.7:1 or about 1:1 to about 15:1 or about 10:1.

In some embodiments the voidage is between about 0.3 and about 0.9, about 0.3 and about 0.85, more preferably between about 0.3 and about 0.8, more preferably between about 0.5 and about 0.98, further preferably between about 0.8 and about 0.95.

In some embodiments the volume loading ratio of the active material when converted to Pb to conductive fibres is between about 0.7:1 or about 1:1 and about 7:1, or about 1.5:1 and about 5:1, or about 2:1 and about 4:1.

Typically the voidage may be present as corridors to form between the lead and carbon to enable lead particles to form between each of the carbon fibres. In some embodiments the average spacing between conductive fibres is between about 0.5 and about 10, more preferably between about 1 and about 5 fibre diameters. In some embodiments the average interfibre spacing between fibres is less than 50 microns or less than 20 microns. Preferably said average interfibre spacing is over at least a major fraction of the material and more preferably over substantially all of the material. In preferred embodiments the average fibre diameter is less than about 20 or less than about 10 microns.

In broad terms in another aspect the invention comprises a lead-acid battery or cell including at least one (non-composite or composite) electrode comprising as a current collector a conductive fibre material comprising, when fully charged, voidage (being the fractional volume occupied by the pores between the lead and conductive fibres) of at least about 0.3 and a loading ratio of the volume of lead (in whatever form) to the volume of conductive fibres (each over at least a major fraction of the electrode) which together define a point on a plot of voidage (x axis) versus loading ratio of the volume of lead to the volume of conductive fibres (y axis) that falls within an area defined by one line on said plot from an x axis voidage value of about 98% with a slope of about −1/0.02 and the another line on said plot an x axis voidage value of about 70% with a slope of about −1/0.3.

In some embodiments the voidage and mass loading ratio of lead to the mass of conductive fibres when converted to volume ratio together define a point on said plot that falls within an area defined by one line from an x axis voidage value of about 97% with a slope of about −1/0.03 and another line from an x axis voidage value of about 80% with a slope of about −1/0.2, or an area defined by one line from an x axis voidage value of 96% with a slope of −1/0.04 and another line from an x axis voidage value of 85% with a slope of about −1/0.15.

In broad terms in another aspect the invention comprises a lead-acid battery or cell including at least one (non-composite or composite) electrode comprising as a current collector a carbon fibre material having a carbon fibre volume fraction of less than 40%, and a loading ratio of the volume of lead (in whatever form) to the volume of carbon fibres greater than 0.5 (each over at least a major fraction of the electrode and more preferably over substantially all of the electrode).

In some embodiments the carbon fibre volume fraction of less than 30%, and mass loading ratio of lead to carbon fibres converted to volume ratio is greater than 0.7, or the carbon fibre volume fraction is less than 20% and mass loading ratio of lead to carbon fibres converted to volume ratio is greater than 1:1.

In broad terms in another aspect the invention comprises a lead-acid battery or cell including at least one (composite) electrode comprising as a current collector a conductive fibrous material, and comprising a metal grid, the electrode also comprising a current generating electrolyte active mass at least 20% of which is in the conductive fibrous material.

In some embodiments at least 40%, 50%, 80%, or not more than 80% of the active mass is in the conductive fibrous material. Thus less than 80%, 60%, 50%, or 20% of the active mass may be dispersed in the metal grid.

In some embodiments conductive fibrous material comprises a carbon fibre material and the metal grid comprises a lead grid.

In some embodiments the conductive fibrous material is present as multiple layers at least one on either side of the metal grid. Alternatively the conductive fibrous material is present as a single layer on one side of the metal grid.

The metal grid may have a similar superficial surface area or be of similar height and width dimensions particularly in a major plane, to the conductive fibrous material element(s) but in alternative embodiments the metal grid may have smaller dimensions for example of smaller height and width dimensions, and may comprise for example a narrower lead strip between two larger carbon fibre layers on either side thereof.

The carbon fibre layer(s) are conductively connected to the metal grid so that the grid receives current from the carbon fibre layer(s) and connects the electrode externally thereof.

The conductive fibrous material may be a woven material (comprising intersecting warp and weft fibres), a knitted material, or a non-woven material such as a felt material. The positive electrode or electrodes, the negative electrode or electrodes, or both, may be formed of one or more layers of the conductive fibrous material. Preferably the conductive fibrous material density is also lighter than that of lead. The current collector material may comprise a carbon fibre material such as a woven or knitted or felted or non-woven carbon fibre fabric. Carbon fibre current collector material may be heat treated to sufficient temperature to increase its electrical conductivity. The thermal treatment may be by electric arc discharge. Typically the conductive fibrous material, has length and width dimensions in a major plane of the material and depth perpendicular to said major plane of the material. The current collector fibrous material may have an average depth of the material of at least 0.2 mm or at least 1 mm and/or less than 5 mm or 3 mm or 2 mm. The current collector may comprise multiple layers of the conductive fibrous material. The current collector material has bulk resistivity less than 10 Ωmm and preferably less than 1 Ωmm or 0.1 Ωmm.

In broad terms in another aspect the invention comprises a lead-acid battery or cell including at least one electrode comprising as a current collector a conductive fibrous material, and comprising a metal grid, the electrode also comprising a current generating electrolyte active mass, the conductive fibrous material having a bulk resistivity of less than 10 Ωmm.

In at least some embodiments, cells and/or batteries comprising an electrode construction of the invention may have both improved or relatively high DCA and CCA, and/or may maintain DCA or a higher rate of DCA with an increasing number of charge-discharge cycles, and thus may be particularly suitable for use in hybrid vehicles. Cells and/or batteries of the same or other embodiments of the invention may also or alternatively have reduced water consumption and/or improved or relatively high VED and/or improved battery life.

The term "comprising" as used in this specification means "consisting at least in part of" When interpreting each statement in this specification that includes the term "comprising", features other than that or those prefaced by the term may also be present. Related terms such as "comprise" and "comprises" are to be interpreted in the same manner.

BRIEF DESCRIPTION OF THE FIGURES

The invention is further described with reference to the accompanying figures by way of example wherein:

FIG. 5 is a schematic cross-section through an electrode of an embodiment of the invention with a metal wire or tape attached to one side as a macro-scale current collector, FIG. 6 is a schematic cross-section through an electrode composed of two sections of electrode material of an embodiment of the invention with a metal wire or tape embedded or sandwiched between as a macro-scale current collector, FIG. 7 is a schematic cross-section view of illustrating felt splitting for forming carbon fibre electrode material of some embodiments of the invention, FIG. 8 schematically illustrates one form of reactor for the continuous or semi-continuous activation of a carbon fibre material for use as a current collector material according to the invention.

DETAILED DESCRIPTION OF PREFERRED EMBODIMENTS

Figure 1:
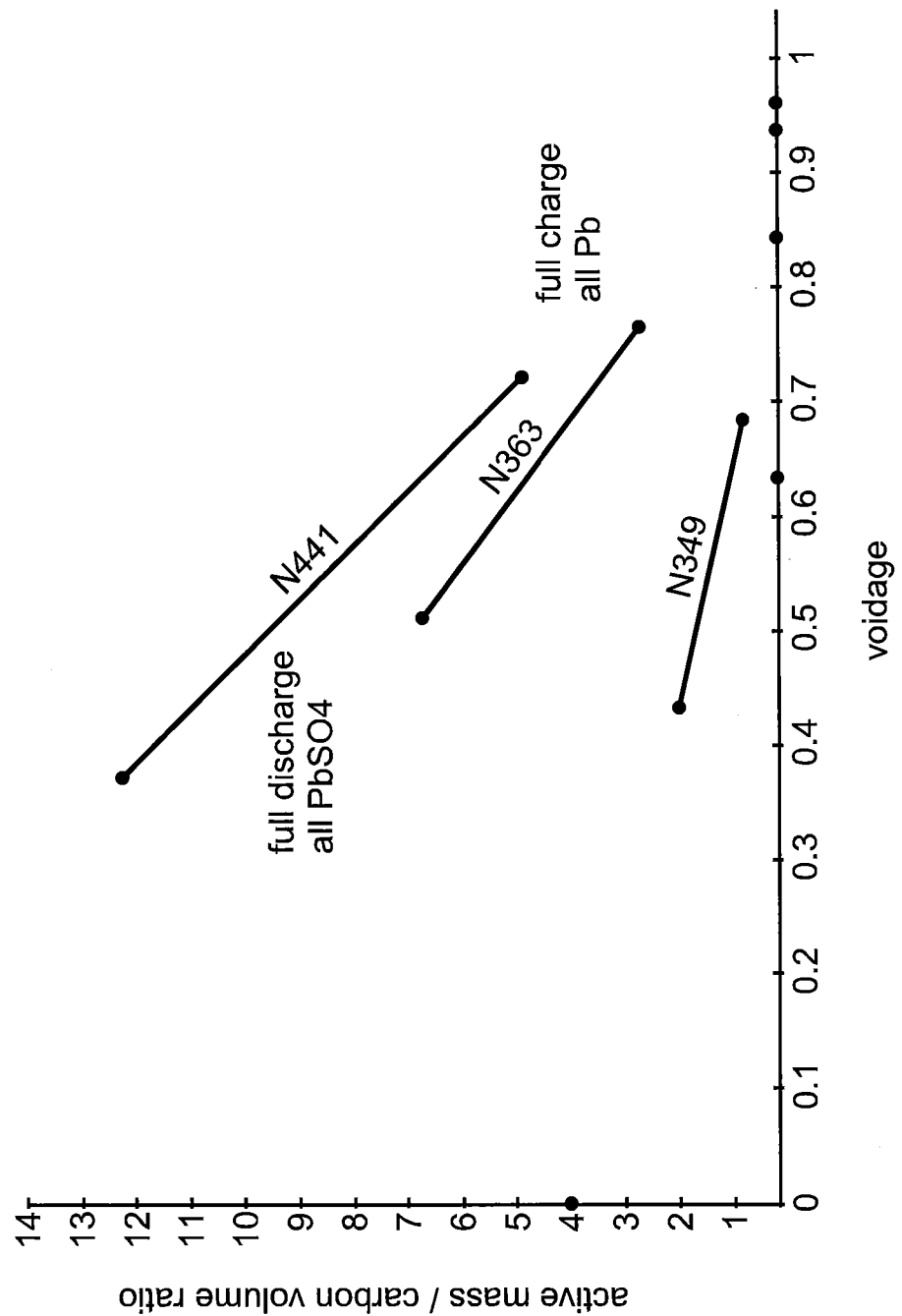
FIG. 1 is a plot of ratio of active material to carbon (volumetric ratio) versus voidage, for various negative electrodes used in a lead acid cell, all made up from active material loaded into a carbon matrix.

Referring to FIG. 1 which is a chart of ratio of active material to carbon (volumetric ratio) versus voidage, in one embodiment a lead-acid battery or cell according to the invention includes at least one electrode comprising as a current collector a conductive fibrous material comprising voidage (being the fractional volume occupied by the pores between the lead and conductive fibres) when fully charged of at least about 0.3, and a mass loading ratio of lead (in whatever form) to the mass of conductive fibres, when converted to volume ratio in the range about 0.7:1 or about 1:1 to about 15:1 or about 10:1. (and assuming full conversion of all active material to Pb when fully charged). In some embodiments the voidage is between about 0.3 and 0.9, between about 0.3 and about 0.85, between about 0.3 and about 0.80, between about 0.5 and about 0.98, between about 0.7 and 0.95, between about 0.5 and 0.98, or between about 0.8 and about 0.95, and the volume loading ratio of the active material when converted to Pb to conductive fibres is between about 0.7:1 or about 1:1 and about 7:1, between about 1.5:1 and about 5:1, or between about 2:1 and about 3:1.

The ratio of active material volume to carbon volume refers to the volume of the Pb-containing active material in the conductive fibrous matrix. Voidage refers to the void volume among the particles of active material and the conductive fibrous matrix, divided by the total volume. The solids volume ratio versus the voidage for a number of different electrodes described in the subsequent experimental examples is shown in FIG. 1. FIG. 1 allows for different matrix voidages, variation of the extent of filling this matrix voidage with solid active material for example at pasting, and variation in state of charge. Each line is drawn between the volume ratio and voidage for two extreme forms of the active material contained in a given carbon matrix. For most electrochemical cycling these two forms are Pb and $PbSO_4$. Electrodes made with a specific carbon matrix occupy a single line on the chart, and pass through the point of matrix voidage with no active material. The extent of active material loading (and the form it is in e.g. PbSO4, or Pb) determines which point on the (straight) line the electrode is (currently) represented by, taking account of the different densities of the different forms, and how much of each is present. For example, if the matrix is initially loaded with $PbSO_4$, and then fully charged to Pb, this formation is represented by travelling along a section of the line, "fully discharged" to "fully charged". If the matrix is initially loaded with PbO and then fully charged to convert this to Pb, then a different line is drawn to represent the path from PbO to Pb. However after this first conversion to Pb, the path followed in any subsequent cycling will follow the line between Pb and $PbSO_4$. Thus discharge/charge from this full charge point on will be represented by paths along the same line as when initially loaded with $PbSO_4$. Only when it is fully charged (i.e., at 100% Pb) will the electrode using PbO as the precursor be represented on the more useful PbSO4/Pb line and thereafter i.e. during further cycles, the electrode path will be on that line. The lines labelled 349, 363, and 441 in FIG. 1 are for electrodes the construction of which is described in the subsequent experimental examples. The lowermost points of each line represents the conditions where all the loaded active material has been converted to Pb.

The voidage within the electrodes of a lead-acid cell or battery is important for both containing one of the active materials—the acid—and for allowing ions access to the surface that supplies or accepts electrons. We express this volume as the fraction of the total volume ('voidage') of the part of the electrode containing the electrolyte. The ratio of volume of lead to volume of conductive fibre such as carbon fibre refers to the balance between the matter (Pb) potentially capable of yielding charge or accepting it, and the matter of conductive fibre such as carbon fibre providing a conduit for the electrons and optionally also a catalytic surface for the electrochemical reactions. This ratio may be expressed as a volume ratio. Both volume and mass ratios can be calculated for the fully charged state (where only Pb exists) and fully discharged state (only $PbSO_4$). In normal cycling charge and discharge, the discharge finishes before reacting 100% of the $PbSO_4$. Any given electrode can be characterised by two parameters: 1. the matrix voidage before loading with active material (or more conveniently the matrix volume fraction which is 1 minus this voidage), and 2. the volume ratio of the active material and carbon matrix when the active material has been fully converted to lead. A further parameter can be represented on the chart. The utilization of lead to provide charge is the fraction of the total possible path traveled from Pb to $PbSO_4$ that the electrode is capable of during discharge.

The volume ratio that is of importance for reaction rates is the voidage of the electrode material and lead-containing particles. This voidage is needed to allow the ions of acid and Pb++ to diffuse to and from the reacting surface.

Figure 2:
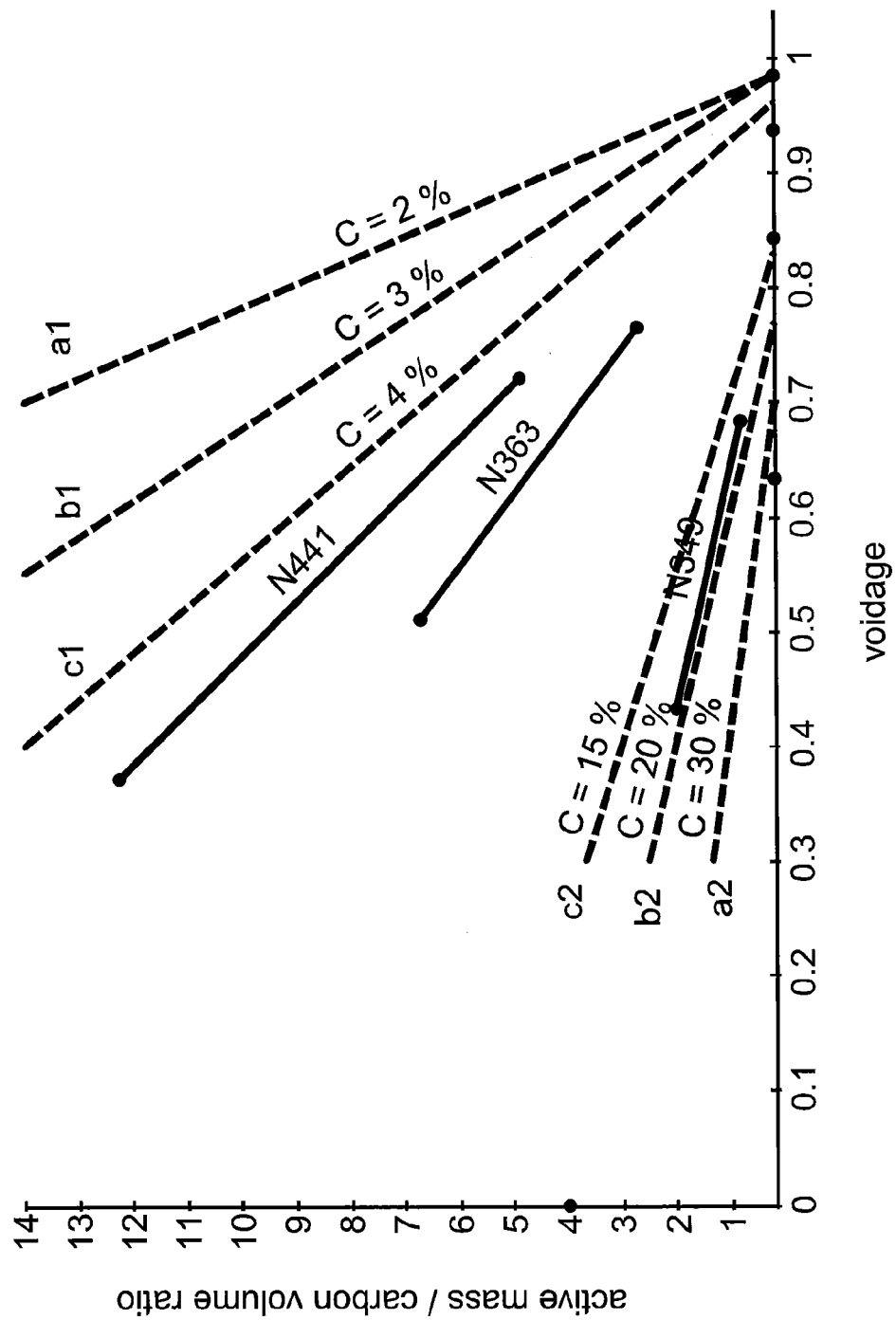
FIG. 2 is a plot of areas of ratio of active material to carbon (volumetric ratio) versus voidage, that also includes the various electrodes in FIG. 1, FIG. 3a schematically shows a carbon fibre electrode with a metal lug for external connection of the electrode formed on the carbon fibre material by pressure die casting.

FIG. 2 is similar to FIG. 1 but also shows lines characterised by certain carbon matrix volume fractions which define areas of ratio of active material to carbon (volumetric ratio) versus voidage. Line a1 labelled C=2% extends from an x axis voidage value of 98% with a slope of −1/0.02 and line a2 labelled C=30% extends from an x axis voidage value of 70% with a slope of −1/0.3. Electrodes which when fully charged, have a voidage and a mass loading ratio of lead to the mass of conductive fibres when converted to volume ratio which define a point in the area between lines a1 and a2 are electrodes of embodiments of the invention.

Line b1 labelled C=3% extends from an x axis voidage value of 97% with a slope of −1/0.03 and line b2 labelled C=20% extends from an x axis voidage value of 80% with a slope of −1/0.2. Electrodes which when fully charged, have a voidage and a mass loading ratio of lead to the mass of conductive fibres when converted to volume ratio which define a point in the area between lines a1 and a2 are electrodes of preferred embodiments of the invention.

Line c1 labelled C=4% extends from an x axis voidage value of 96% with a slope of −1/0.04 and line c2 labelled C=15% extends from an x axis voidage value of 85% with a slope of −1/0.15. Electrodes which when fully charged, have a voidage and a mass loading ratio of lead to the mass of conductive fibres when converted to volume ratio which define a point in the area between lines a1 and a2 are electrodes of more preferred embodiments of the invention. In particular such electrodes may be used for forming cells and/or batteries with both improved or relatively high DCA and CCA, and may also have low water consumption, which are particularly suitable for use in hybrid vehicles.

The slope of lines a1 & a2, b1 & b2, and c1 & c2 is described by the formula relating voidage and the ratio of volume of lead to volume of conductive fibre:

$$R = \frac{1-\phi_c}{\phi_c} - \frac{\varepsilon}{\phi_c}$$

where $\varepsilon$ is voidage, R is the ratio of volume of lead to volume of conductive fibre, and $\phi_C$ is the volume fraction of the carbon matrix. The lowest point on this line is that describing the fully lead condition, which we can label as $R_{Pb}$, $\varepsilon_{Pb}$.

The cycling performance may depend on maintaining a suitably small particle size for the Pb and $PbSO_4$ particles after many cycles. This small particle size gives a sufficient surface area for sufficient dissolution of $PbSO_4$ or Pb into Pb++ to give the rates and currents required, when the particles are close to a carbon fibre surface, which catalyses the current creation reactions. The size of the particles after many cycles may be closely related to the size of the interfibre spacing between the conductive fibres. Thus with smaller diameter conductive fibres at the same total volume fibre fraction the gaps between these will be proportionately smaller and also the active particles will be proportionately smaller. Thus higher surface areas and higher rates may be achieved with smaller fibres.

In relation to the ratio of particle size to diameter of the conductive fibre, as the particle size changes extensively during electrode cycling, the final particle size is somewhat independent of the starting size. However the starting size should be chosen small enough to fit easily between the fibres, such as less than around 10 microns for 7 or 8 micron diameter fibres for example. It is expected that the eroding action of each carbon fibre on the surrounding $PbSO_4$ particles during charging keeps these from growing larger over many cycles. Thus 'sulphation' may be reduced or avoided and long cycle life obtained.

A stated the conductive fibrous material may be a woven material (comprising intersecting warp and weft fibres), a knitted material, or a non-woven material such as a felt material. The current collector material preferably has bulk resistivity less than 10 $\Omega$mm and preferably less than 1 $\Omega$mm or 0.1 $\Omega$mm. The material may comprise a carbon fibre material such as a woven or knitted or non-woven or felted carbon fibre fabric. Non-woven materials with random fibre entanglement and intersections may be advantageous over woven materials with regular intersections of warp and weft fibres at right angles.

Suitable carbon fibre material may comprise or be derived from rayon, polyacrylonitrile, phenol resin, or pitch materials.

Typically the conductive fibrous material has length and width dimensions in a major plane of the material and an average thickness perpendicular to said major plane of the material, which may be for example about 0.2 mm or about 1 mm and/or less than 5 mm or less than 3 mm or less than 2 mm.

In at least some embodiments the conductive fibrous material also has an average spacing between conductive fibres in the range about 0.5 to about 10 times or about 1 and about 5 times the average fibre diameter, or less than about 20 microns, or less than about 10 microns, and an average conductive fibre diameter of less than about 10 microns.

Felt or other non-woven planar electrode material may be produced to very low thickness such as for example 2.5 mm or less thickness by dividing thicker material in plane. That is, the material may be cut in its plane one or more times to divide a thicker non-woven material into multiple sheets of similar length and width but reduces thickness to the starting sheet. This is schematically illustrated in FIG. 7 which shows fine cutting blade 60 which passes continuously around and is driven by drive rollers 61 and 62, in plane slicing carbon felt sheet 63 on bed 64 to form two carbon felt sheets of the same length and width but half thickness. Each resulting carbon sheet may be further in plane divided.

Woven carbon fibre material may be woven from carbon fibre tows which have been 'stretch broken' ie a tow (bundle) of a larger number of continuous carbon fibre filaments is stretched after manufacture to break individual continuous filaments into shorter filaments and separate lengthwise the ends of filaments at each break, which has the effect of reducing the filament count of the carbon fibre tow. The resulting reduced filament count tow is twisted (like a rope) to maintain tow integrity. For example a tow of 50,000 continuous filaments may be stretch broken to produce a much longer tow composed of 600 shorter individual filaments which is then twisted, for example.

In at least some embodiments the conductive fibrous material comprises filaments of average length in the range 3 to 50 mm.

The negative electrode or electrodes, the positive electrode or electrodes, or both, of a cell or battery may be formed as above.

In preferred embodiments the conductive current collecting material fibres are inherently conductive. In preferred embodiments the electrode fibres are carbon fibres. However the carbon fibre material may in some embodiments be treated to increase conductivity. In other embodiments the electrode fibres may be a less conductive microscale material, the fibres of which are coated with a conductive or more conductive coating. In some embodiments the fibres of the current collector material may be coated with Pb or a Pb-based material. For example the negative electrode or electrodes may be coated with Pb and the positive electrode(s) coated with Pb and then thereon $PbO_2$.

Preferably the current collector material and the fibres thereof are flexible, which will assist in accommodating volume changes of the active material attached to the current collector material during battery cycling, and the microscale fibres may also reinforce the active material, both properties assisting to reduce breaking off ("shedding") of active material from the electrode in use.

In some embodiments the conductive fibrous material comprises the sole current collector of the or each electrode.

Alternatively the or each electrode may comprise a metal grid also as a current collector in addition to the conductive fibrous material of carbon fibre. In preferred embodiments conductive fibrous material comprises a carbon fibre material and the metal grid comprises a lead grid. The carbon fibre layer(s) are conductively connected to the metal grid so that the grid receives current from the carbon fibre layer(s) and connects the electrode externally thereof.

The negative or positive or both electrodes of each cell may comprise a metal grid.

Where the electrode comprises a metal grid preferably at least 20% of the current generating active mass is dispersed through the conductive fibrous material. In preferred embodiments at least 40%, 50%, 80%, or more than 80% of the active mass is dispersed in the conductive fibrous material. Thus less than 80%, 60%, 50%, or 20% of the active mass may be dispersed in the metal grid (specifically, within its apertures).

In some embodiments at least 20% but not more than 40% of the active mass is dispersed through the conductive fibrous material.

In preferred embodiments the conductive fibrous material is present as multiple layers one or more on either side of the metal grid. Alternatively the conductive fibrous material is present as a single layer on one side of the metal grid.

The metal grid may have a similar superficial surface area or be of similar height and width dimensions particularly in a major plane, to the conductive fibrous material element(s) but in alternative embodiments the metal grid may have smaller dimensions for example of smaller height and width dimensions, and may comprise for example a narrower lead strip between two larger carbon fibre layers on either side thereof.

Typically during battery or cell construction the microscale current collector material is impregnated under pressure with a paste, which in a preferred form comprises a mixture of Pb and PbO particles of Pb and PbO and dilute sulfuric acid. Alternatively the paste may comprise lead sulphate ($PbSO_4$) particles and dilute sulphuric acid. In some embodiments the paste at impregnation into the electrode comprises dilute sulphuric acid comprising between greater than 0% and about 5%, or between 0.25% and about 3%, or between 0% and about 2%, or between 0.5 and 2.5% by weight of the paste of sulphuric acid. The Pb-based particles may comprise milled or chemically formed particles which may have a mean size of 10 microns or less, small enough to fit easily into spaces between the fibres.

The paste may optionally also contain other additives such as carbon black, barium sulphate, and/or an expander such as a lignosulphonate. Barium sulfate acts as a seed crystal for lead sulphate crystallisation, encouraging the lead to lead sulfate reaction. An expander helps prevents agglomeration of sulphate particles at the negative plate, for example forming a solid mass of lead sulfate during discharge.

For example an expander may comprise between about 0.05% to about 0.25% or about 0.09 to 0.2% or about 0.09 to 0.17% by weight of the paste at impregnation. It has been found that the inclusion of an expander compound in the paste may have a beneficial effect on CCA performance but a negative effect on DCA performance. Conventionally an expander at a concentration of around 0.2% or more is added to the paste. It has been found that at an expander concentration of between about 0.09% to about 0.15% by weight of the paste at impregnation both good DCA and CCA performance can be achieved.

The paste may also comprise Ag, Bi, Zn, or a compound of any thereof as an anti-gassing agent.

The paste may have relatively low viscosity for example flow rather than be self supporting on a horizontal surface under gravity, at impregnation into the electrode material. Preferably the paste has a creamy consistency. It has been found that this is achieved where the paste at impregnation into the electrode comprises (greater than 0 but) less than 5% by weight of dilute sulphuric acid.

To aid impregnation of the electrode material by the paste a low frequency vibration for example at less than 2 kHz or less than 1 kHz or in the range 50 to 500 Hz may be applied to the paste or the electrode material or both. It has also been found useful when mixing the Pb-based particles, sulphuric acid, and water to form the paste, to aid mixing by vibration of the paste during mixing.

During initial cell formation (first charge and discharge cycle during which active particle linkages form) after cell or battery construction, cell formation occurs first by building the conducting framework, taking up most of the Pb in the negative active material, building normally over lengths of several millimeters (connecting strings of perhaps a thousand or more micron sized particles end to end). This stage also produces small $PbSO_4$ particles. Second, these smaller particles attach to this conductive framework to provide and receive current. In accordance with the invention the Pb grid is replaced or supplemented by a microscale fibrous current collector and the paste comprises $PbSO_4$ or PbO or Pb particles (or other particles of Pb compounds), requiring during formation substantially only attaching the Pb from these Pb containing particles to the nearest fibres in the microscale conductive current collector material. It may be advantageous that during formation the charging current is pulsed periodically.

The fibrous current collector material may be supported mechanically and a supporting mechanical frame may also provide electrical connection of each electrode to the cell or battery terminals (external electrode connection). For example one or more square or rectangular adjacent layers of the current collector material may be supported to form a planar battery plate by a peripheral metal frame on all sides or between opposite metal frame elements on two opposite sides. Alternatively for example concentric cylindrical positive and negative plates of each cell may comprise cylindrical sections of the microscale current collector supported at either cylindrical end by circular metal frames. Generally all forms of external connector are referred to herein as a 'lug'.

Figure 3A:
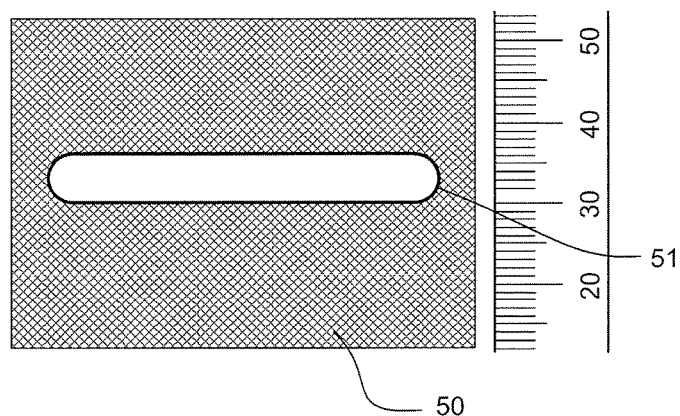
FIG. 3b shows a different shaped lug with a tab addition.
FIG. 3c shows a cross-section of multiple layers of carbon fibre material with a lug, FIG. 4 schematically shows an electrode of an embodiment of the invention from one side with a metal wire or tape attached to one side as a macro-scale current collector.
Figure 3B:
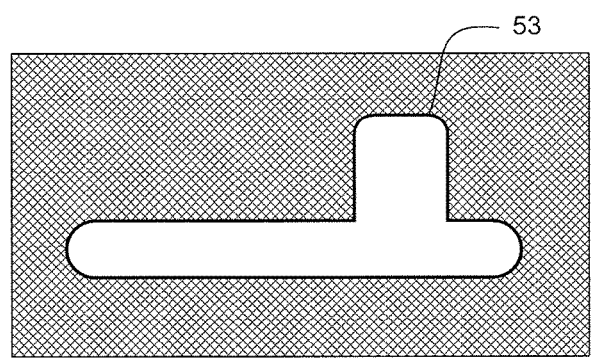
Figure 3C:
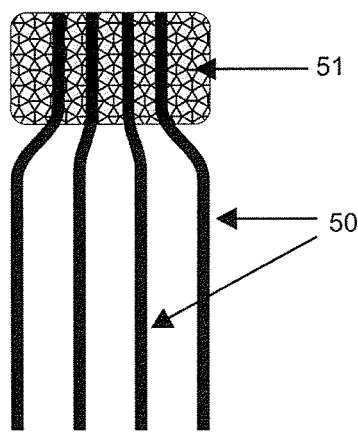

FIG. 3a schematically shows woven carbon fibre electrode 50 with a metal lug 51 for external connection of the electrode formed on the carbon fibre material by pressure die casting, FIG. 3b shows a different shaped lug with a tab addition 53, and FIG. 3c shows a cross-section of multiple layers of carbon fibre material with a lug. The lug is formed of metal such as Pb or a Pb alloy (herein both referred to inclusively as Pb) but may be formed of another material which electrically connects preferably by penetration into and/or between the fibrous material. Preferably the lug extends substantially fully along an edge of the electrode. For example if the electrode has a square or rectangular shape the lug extends substantially the full length of one edge of the electrode. Preferably the lug is substantially no thicker than the electrode material itself.

In some embodiments substantially all or at least a majority of filaments/fibres of the electrode material extend continuously across the electrode between or to a metal frame or frame elements to which both ends or at least one end of the fibres is/are electrically connected. A woven fabric of continuous fibres may be optimal.

The electrical connection between the carbon fibres and the lug or conductive frame should be a minimum resistance join and in a preferred form each fibre end is surrounded with a molten metal which physically fixes and electrically connects the fibre end to the metal frame, during battery or cell construction. The metal frame or frame elements may themselves be formed by cooling molten metal strips along one or more edges of the electrode material to surround and embed the fibre ends. Optionally the fibres or fabric can continue beyond one or more frame elements at one or more edges to form another adjacent electrode or electrode section. Preferably substantially all or at least a majority of electrode fibres in one direction or in plane axis of the material are electrically connected to a metal frame element not more than 100 mm to 10 mm away from where the fibre starts in the active material or at both opposite edges of the material. This distance or the size or area of each current collector material section is mainly determined by the bulk resistivity of the current collector material in the most conducting direction. If only one edge of the fabric is electrically connected to a metal frame element, preferably this most conducting direction in the fabric is aligned perpendicular to the connected edge to minimize the overall resistance. To allow highest current density in an electrode without significant capacity loss, the length of the fabric from the connected edge may be up to about 50 to 100 mm. A metal frame may alternatively comprise a metal sheet with apertures, on one or both sides of the material, leaving the apertures or windows with solely carbon fibres carrying the current and collecting from the active material that they carry. For example an electrode frame of height 200 mm, may comprise two windows of height each 100 mm, with a conducting web left around the edge so that the farthest distance from any crossbar is 50 mm. For each of these window regions, carbon fabric can be spread and attached within the metal cross-bars and within the edges.

Figure 4:
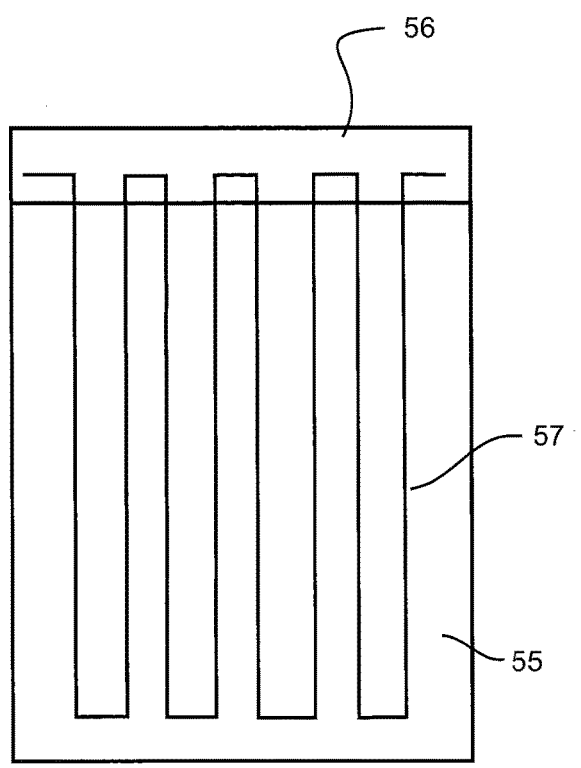

FIG. 4 schematically shows an electrode 55 from one side with a metal lug 56 along one edge similar to FIG. 3. In this embodiment the electrode on one or both sides of a carbon fibre material comprises a metal wire or tape 57 electrically conductively attached to the electrode material 55 and to the lug 56, to provide an additional macro-scale current collecting pathway from the carbon fibre to the metal lug 56, in addition to the micro-scale pathways through the carbon fibre material itself of the electrode. The metal wire or tape may be attached to the electrode material for example by stitching or sewing with a thread that will not dissolve in the electrolyte, or other inert Pb acid battery binding material that will hold the current collector in place, such as a resin, cement or potting mix. The metal wire or tape may be pressed into the electrode material during manufacture. Alternatively the wire or tape or similar may be soldered to or printed on the carbon fibre electrode material. The metal wire or tape(s) may be arranged in a sinuous shape on one or both sides of the carbon fibre material as shown, extending continuously between the lug 56 at one edge of the electrode, at which edge the wire or tape is conductively connected to the lug 56 by being embedded in the lug, and at or towards another spaced edge of the electrode as shown. Alternatively the wire or tape may extend between metal lugs along opposite edges of the electrode or a frame around the electrode. Alternatively again separate lengths of the wire or tape may extend from the lug at one edge to or towards another edge of the electrode, or alternatively again the wire or tape macro-conductor as described may comprise a metal mesh attached on one or both sides of the carbon fibre material.

FIG. 5 is a schematic cross-section through an electrode 55 with a metal wire or tape 56 attached to one side of the electrode material and FIG. 6 is a schematic cross-section through an electrode composed of two layers 55*a* and 55*b* of carbon fibre material with a metal wire or tape 56 embedded or sandwiched between. The carbon fibres with metal wire or tape between may be compressed together during manufacture.

If formed from copper the wire or tape or mesh or similar including any exposed ends thereof should be protected from oxidation within the cell by coating with lead or titanium or other metal inert in the Pb-acid environment, by for example hot dipping, extrusion, or electroplating. The ends of the wire or tape or mesh may terminate and be embedded in the lug or peripheral frame. It is important that when the current collector is on the outer surface of the electrode that acts as the negative electrode the current collector is protected from anodic oxidation from the positive electrode.

Preferably the wire or tape runs up and down the length of the electrode with equal spacing across the width of the electrode without any cross over points as shown in FIG. 3, to prevent local hotspots occurring or heat build up in particular areas, and an even current collection across the electrode.

Preferably the volume of the wire or tape or mesh or similar macro-scale current collecting system is less than about 15% of the volume of the electrode (excluding the lug or surrounding metal frame or similar).

In some embodiments electrodes of the invention whether composite (also incorporating a metal grid) or non-composite (without a metal grid) have a thickness (transverse to a length and width or in plane dimensions of the electrode) many times such as 10, 20, 50, or 100 times less than the or any in plane dimension of the electrode. The electrode thickness may be less than 5 or less than 3 mm for example. Each of the in plane length and width dimensions of the electrode may be greater than 50 or 100 mm for example. Such electrodes have a planar form with low thickness. One form of composite electrode of the invention may comprise a metal grid of thickness about 3.5 mm or less such as about 0.5 mm thick, with a carbon fibre layer of thickness about 2 mm or less such as about 0.3 mm thick on either side.

In preferred forms the electrode is substantially planar and has a dimension from a metal lug for external connection along at least one edge of the electrode less than 100 mm or less than 70 mm, or less than 50 mm, or about 30 mm or less for example (with or without a macro-scale current collector). Alternatively such a planar form may be formed into a cylindrical electrode for example.

Carbon fibre material for use as the electrode current collector material may be thermally treated. Thermal treatment may also increase the thermal conductivity of the material, which should be sufficient to prevent local hot spots on the electrode in use. Carbon fibres are generally hydrocarbon-based and during manufacture heated to around 1100° C. or more ("carbonized"). For use as current collector material in batteries or cells of the invention, carbon fibre material may be heated further, generally in the range 2200 to 2800° C., to enlarge regions in the carbon that are already aromatic or graphitic, increasing electrical conductivity. Thermal treatment to increase electrical and/or thermal conductivity may be in a resistively heated furnace for example or may be by electric arc discharge where in addition at least some or a major fraction of non-graphitic carbon from the carbon fibres, and no more than a minor fraction of graphitic carbon, may be evaporated off.

Figure 8:
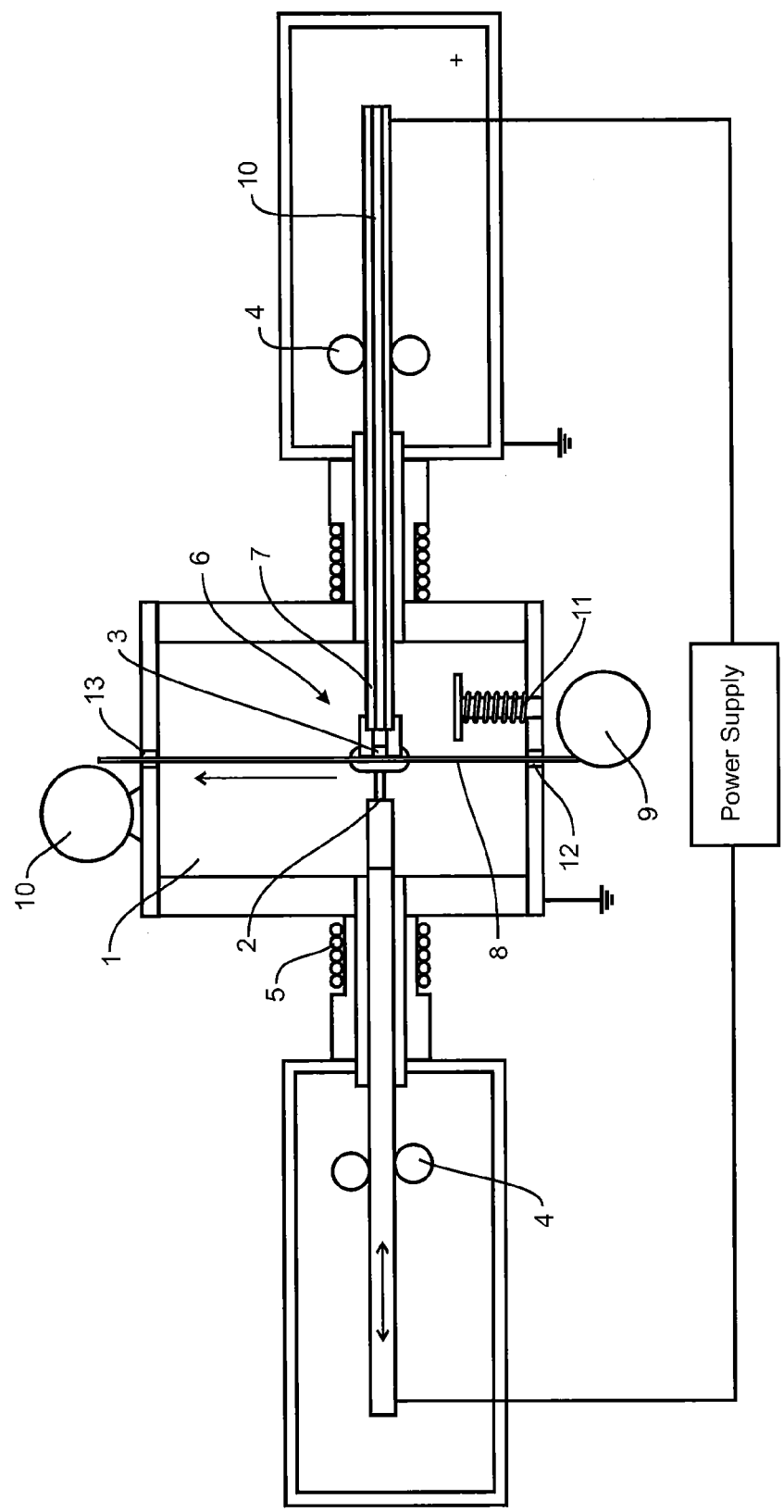
Figure 9:
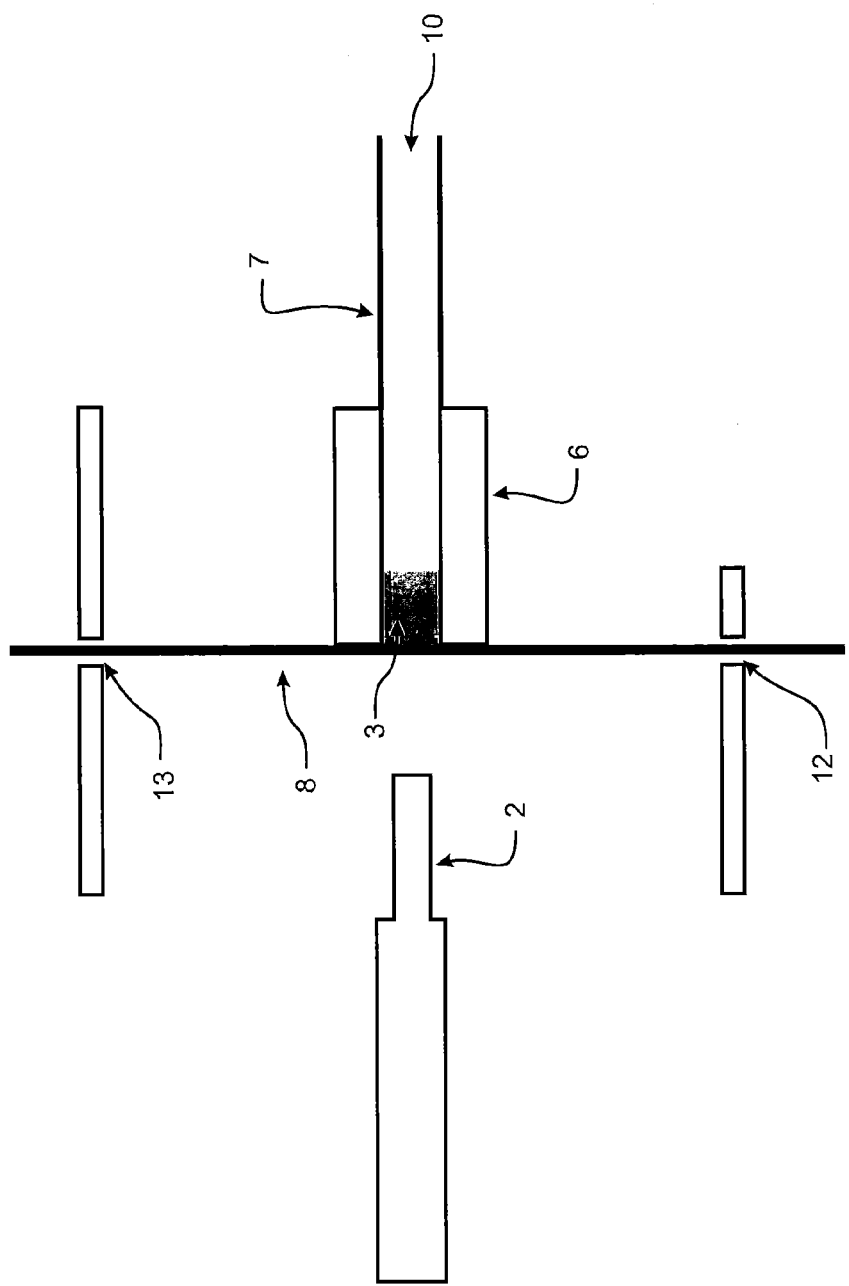
FIG. 9 is a close up schematic view of the electrodes and the material path between the electrodes of the reactor of FIG. 8.

Carbon fibre current collector material may be heat treated to sufficient temperature to increase its electrical conductivity. The thermal treatment may be by electric arc discharge. In certain embodiments carbon fibre material may be treated by arc discharge by moving the carbon fibre material within a reaction chamber either through an electric arc in a gap between two electrodes or past an electrode so that an electric arc exists between the electrode and the material at a temperature effective to activate the material. In FIG. 8, reference numeral 1 indicates a reactor chamber in which the discharge arc is created. Electrodes 2 and 3 project into the reactor chamber 1 and are typically mounted by electrode-feeding mechanisms 4 as are known in the art, so that the position of electrode 3, which maybe the anode, and electrode 2, which may be the cathode (the positions of the anode and cathode may be reversed), may be adjusted to create the arc, and in operation to maintain or if required adjust the arc. A cooling system 5 consisting of copper tube coils wound around each electrodes through which water is circulated may also be arranged to cool the electrode(s). Carbon fibre material 8 passes between electrodes 2 and 3 and through the arc during operation of the reactor, as shown. This is shown in more detail in FIG. 9. The current should be sufficient to vaporise non-graphitic carbon but not trigger the destructive localised arc attachment mode Operation between 10 A and 20 A is recommended. The material may enter the reactor chamber through a slit 12 in the reactor chamber and leave through a similar exit slit 13 in the reactor chamber on the other side of the electrodes. A mechanism is provided to feed the material through the reactor chamber. For example during operation of the reactor the substrate may be unwound from a spool 9 driven by a gearbox which is coupled to an electric motor with an appropriate control system. During operation the interior of the reactor is preferably at or slightly above atmospheric pressure, and the gas flow exiting the reactor through slit 13 is extracted via a fume hood or filter or similar. An inert gas such as nitrogen, argon or helium for example is flushed through the reaction chamber, for example by introducing a controlled gas flow inside the reaction chamber 1 through one of the openings 11 at the base of the reactor. The anode as well as the spool which drives the tape are preferably earthed. Any take-up mechanism for collecting the substrate after it has passed through the reactor chamber is also preferably earthed, as is also the reactor shell. Referring to FIG. 9, it may be preferable for one electrode, which in the figure is the anode 3, to be positioned to impinge on the substrate 8 such that the substrate is tensioned against that electrode as the substrate moves past it as schematically shown. Electric arc discharge may vaporise a major fraction of non-graphitic carbon and no more than a minor fraction of graphitic carbon of the carbon fibre material. The method may be carried out in the presence of an introduced metal additive such as a Pb additive.

A microscale electrode in accordance with the invention with an internal pore surface area may provide capacitance sufficient to add to charge acceptance over and above the electrochemical contribution. An electrode area that is well wetted by and accessible to the acid electrolyte may contribute more than an order of magnitude larger capacitance than that given by the total surface area of a conventional active material in the negative electrode of a lead-acid battery. It may have sufficient electrolytic double-layer capacity to absorb or deliver several seconds of high current. Alternatively a battery of the invention may comprise a separate high surface area electrode, which may comprise arc-treated carbon fibre material as described herein, in parallel to the or each negative or positive cell electrode, to add or increase capacitance.

Thermal treatment for example by electric arc discharge may increase pore surface area and increase capacitance. Also applying and then drying an $Pb(NO_3)_2$ solution onto carbon fibre material before arc treatment may increase surface area development (apparently through oxidation). Alternatively the material may be activated by physical activation such as by steam or carbon dioxide at temperatures around 1000° C., or by chemical activation by for example alkali solutions. Activation typically creates pores of nanoscale and most typically up to 50 nm in diameter, in the material, or on the surface of the material. Materials with extensive pores smaller than around 1 nm may not be good electronic conductors. Pores from 1 nm to around 10 nm may provide the surface area required for significant capacity, but pores well distributed above 10 nm are also needed to provide easy diffusional access of ions for adequate electrolyte conductivity. Also required is sufficient electrical conductivity within the solid.

In some embodiments carbon fibre material has carbon nanotubes (CNTs) attached thereto. The CNTs bearing material may be produced by electric arc discharge treatment of the carbon fibre material, or alternatively by chemical vapour deposition at lower temperatures in the presence of a catalyst.

As stated, in preferred forms suitable for use in hybrid vehicles cells and/or batteries comprising an electrode construction of the invention may have both improved or relatively high DCA and CCA (DCA measured by the Axion test and CCA as measured in accordance with the SAE J357 CCA test for example, and/or may maintain DCA or a higher rate of DCA with increasing number of charge-discharge cycles, and may also have low water consumption, and may also have improved or relatively high VED and/or improved battery life. Embodiments of cells or batteries of the invention may maintain DCA at least 70% or 80% or 90% of starting DCA (when first fully charged) after 5000 or 10000 cycles for example. Embodiments of cells or batteries of the invention may retain an average DCA of at least 0.6 or 0.7 or 0.8 A/Ah per charging phase at 10,000 cycles using the Axion DCA Test. The capacity of a battery is measured in Amp/hours, and utilisation is the actual battery capacity divided by the theoretical maximum capacity, and embodiments of cells or batteries of the invention may have increased utilisation such as a utilisation of at least 55%, 60%, 70%, or 80% or over.

EXAMPLES

Figure 10:
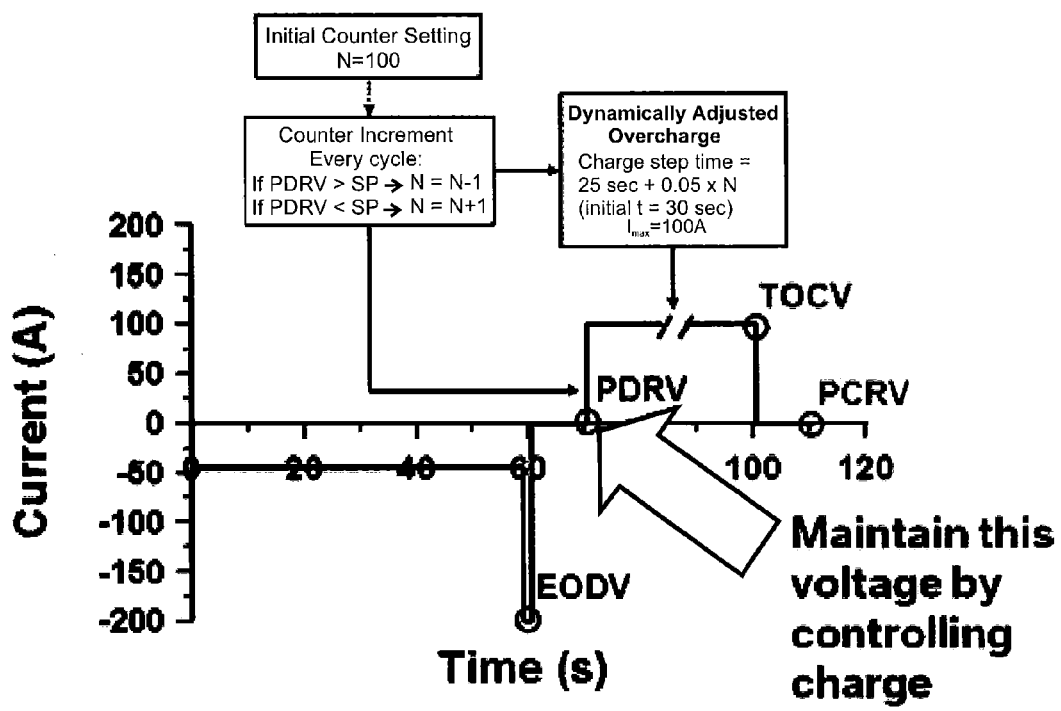
FIG. 10 shows the Axion DCA test algorithm referred to in the subsequent description of experimental work.

The following description of experimental work which is given by way of example further illustrates the invention. In some of the examples a DCA testing is referred to and FIG. 10 shows the DCA test algorithm in accordance with which a high rate dynamic charge acceptance test (DCAT) designed to simulate the demands a stop/start micro hybrid vehicle on its battery system was applied to each cell. The DCAT test profile is an accelerated, destructive life time test on the battery which is held at a constant state of charge, which ensures the DCAT test is independent of the test system and calibration issues associated with that system, thus avoiding calibration issues normally associated with other lifetime test protocols. The DCAT test employed followed the Axion DCAT test profile on a Cadex C8000 test system, where the test profile consists of the following steps:—

0.51 C discharge for 60 s
3.15 C pulse discharge for 1 s
10 s rest (at the end of which PDRV (Post discharge rest voltage) is measured)
1.05 C dynamic charge period adjusted to hold PDRV at a given set point
10 s rest.

This described cycle profile is iterated to a cycle count of 30,000 which translates to a typical 6 week period, although this period is dependent on battery performance. Every 5000 cycles, a full charge followed by a deep discharge measured the electrode capacity. To pass this test, the cell needs to be able to cycle through the DCAT test at least 30,000 times while retaining the capacity at least 2 Ah. 30,000 cycles is representative of a battery lifetime in a micro hybrid of approx. 3 years.

Example 1

Composite Electrode of Carbon Fibre Paper with Pb Grid—N371

Method:

An electrode was constructed from carbon fibrous paper carbon mat (Z-Mat produced by Zoltek) of thickness of 3 mm, ~6% carbon fraction in volume, specific weight ~312 g/m², and fibre length of 25 mm. Two pieces were cut to dimensions 44 mm*70 mm and then split into thinner layers to produce individual layers of average thickness of 0.26 mm. The electrode was constructed by placing one of these carbon fibrous layers on each of the two surfaces of a lead grid.

Paste was prepared with 23.2 g of leady oxide (leady oxide batch purchased from Exide in 2009), 4.0 g of diluted sulphuric acid, 2.7 g of Vanisperse A (expander) aqueous solution with enough Vanisperse A to achieve 0.10 wt % in the prepared paste and 0.187 g of barium sulphate. The paste was mixed in an ultrasound bath for 2 minutes (53 kHz frequency, at 23° C. tank temperature). One of the fibrous layers was placed on a flat plate and the lead grid was then placed on top of the fibrous layer. The Pb grid had thickness 2.02 mm, length 66.3 mm, width 44.2 mm, and open volume fraction ~81.6%. Paste was spread on the lead grid surface until a smooth distribution of paste on the surface was obtained where all grid pockets were filled with the paste.

Sufficient excess paste to partly fill a fibrous layer was then spread over the pasted grid surface and a second carbon fibrous layer then placed on top. Further paste was spread on the top surface to get a smooth and even surface. Excess paste was removed from both faces and the side edges of the electrode. The total thickness of the pasted electrode was approximately 2.60 mm.

The total amount of wet mass loaded in to the composite electrode was 24.41 g where the achieved capacity (low current discharging) was 2.695 Ah (i.e. 60% of the theoretical capacity). Assuming the paste penetrated/dispersed into the grid and the fibrous layers evenly, 19.8% of NAM dispersed into the fibrous layers of the electrode and the remainder was in the lead grid. At the fully charged state of the electrode, the average active mass Pb to carbon volume ratio is 10.03. The average spacing between carbon fibres was about 23 microns. Subsequently the electrode was air-dried for 24 hours at ambient temperature (18° C.-24° C.) and then the pasted electrode was assembled in a cell containing electrolyte of 1.15 sg $H_2SO_4$ with one (40% SOC) positive electrode on each side. The cell was left soaking for 24 hours at ambient temperature (18° C.-24° C.) and cell standard formation was carried out.

Figure 11:
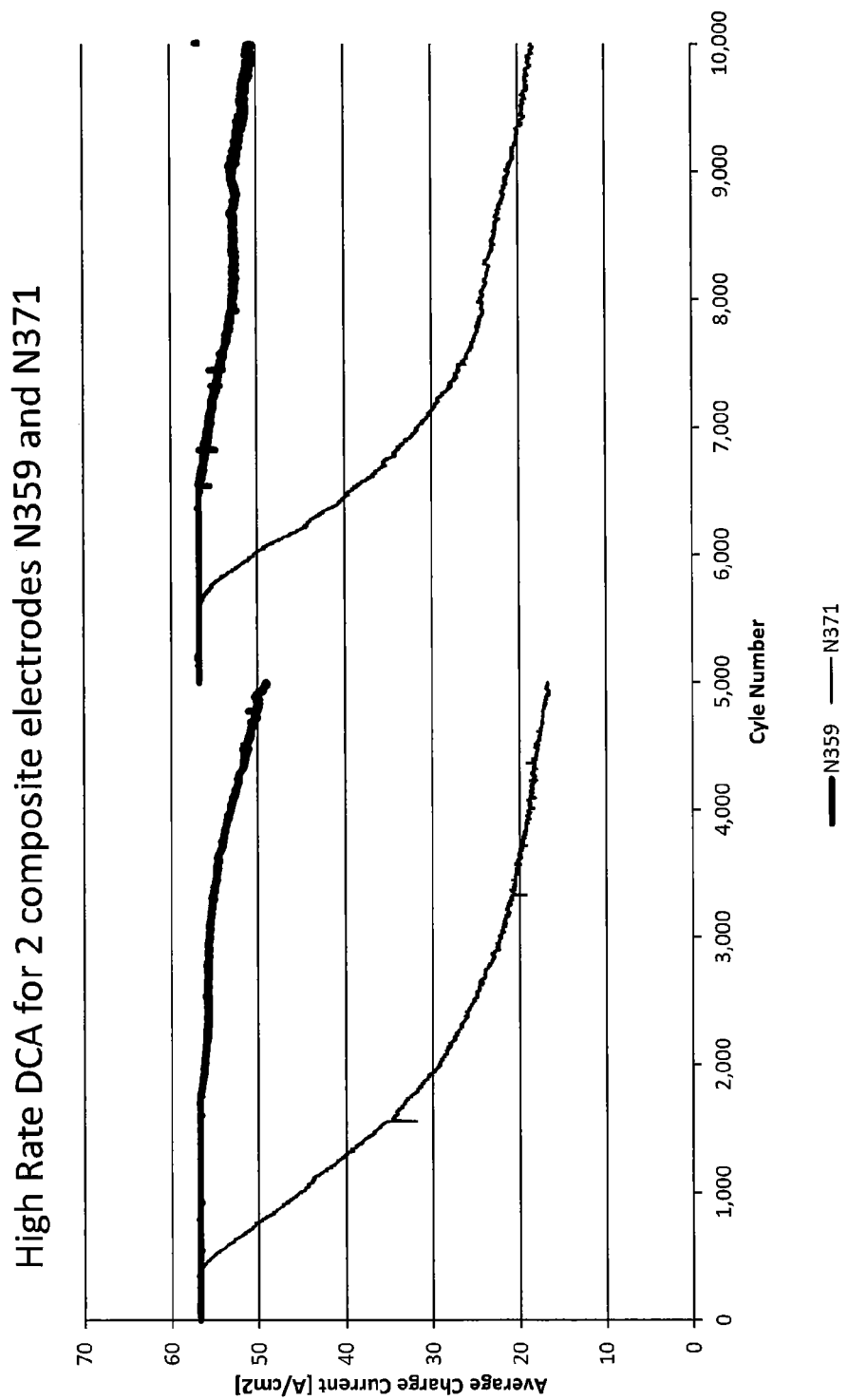
FIG. 11 shows the High Rate DCA performance of two composite electrodes N359 and 371 referred to in the subsequent description of experimental work.

Test Method(s) and Results:

The electrolyte was replaced with 1.28 sg $H_2SO_4$ and stabilised under four cycles of low current discharging (0.06 C) prior to being sent to the high rate DCA. The high rate dynamic charge acceptance test (HR-DCAT) was carried out on the cells in accordance with the test as described above and as shown in FIG. 11. The results are show in table 1 below.

Example 2

Composite Electrode of Arc Treated Carbon Fibre Woven Fabric with Pb Grid—N359

Method:

An electrode was constructed of woven carbon fibre fabric PAN [polyacrylonitrite] based woven carbon fibre tape (manufactured by TaiCarbon, Taiwan). The fabric was treated in an electric arc generally as previously described with reference to FIGS. 8 and 9. This arc-treated fabric had 136 g/m$^2$ specific weight, was 0.38 mm thick, and had ~20% carbon volume fraction. Two pieces of the arc-treated fabric were cut into the size of 44 mm*70 mm. One piece of arc-treated fabric was placed on an ultrasound plate and the lead grid placed on top of that. The Pb grid had dimensions thickness 1.94 mm, length 66.7 mm, width 44.4 mm, and open volume fraction ~81.1%. Paste was prepared and the electrode was pasted and constructed using a second layer of the carbon fibre fabric, all as described in example 1. The total thickness of the pasted electrode was approximately 3.6 mm.

The total amount of wet mass loaded into the composite electrode was 28 g where the achieved capacity (low current discharging) was 2.99 Ah (i.e. 60% of the theoretical capacity). Assuming the paste penetrated/dispersed into the available void volume of the grid and the fibrous layers evenly, 28.1% of NAM dispersed into the carbon fibrous layers of the composite electrode and the remainder was in the lead grid. At the fully charged state of the electrode, the average active mass Pb to carbon volume ratio is 3.20. The average spacing between carbon fibres was about 15 microns.

Subsequently the electrode was air-dried, assembled in a cell, the cell was left soaking, and then formation charging and stabilisation was carried out in the cell, all as described in example 1.

Test Method(s) and Results:

The electrolyte was replaced with 1.28 sg $H_2SO_4$ and stabilised under four cycles of low current discharging (0.06 C) prior to being sent to the high rate DCA. The high rate dynamic charge acceptance test (HR-DCAT) was carried out on the cells in accordance with the test as described above and as shown in FIG. 11. The results are show in table 1 below.

TABLE 1 compares the results of the DCAT testing of the electrodes set out in examples 1 and 2 above.

| Electrode | Electrode material | Electrode thickness | Mass of paste in electrode | % of NAM in CF | DCAT results |
|---|---|---|---|---|---|
| N371 | Carbon fibre paper with approx. 6% carbon vol fraction Pb Grid - Industrial | 2.62 mm total (Pb grid 2.02 mm, CF (0.52 mm comprised of 2 layers) | 24.41 gm | 19.8% | Steep decline in performance from early in the test. |
| N359 | Arc treated woven PAN woven carbon fibre tape with approx. 20% carbon vol fraction | 2.7 mm total (1.94 mm Pb grid, CF 0.76 mm comprised of 2 layers) | 27.1 g | 28.1% | Cell still operating above 2 Ah at 35,000 cycles |

Example 3

Non-Composite Electrode of Arc Treated Carbon Felt, Active Mass/Carbon Volume Ratio ~2.698—N363—See FIGS. 1 and 2

Method:

An electrode was constructed of carbon fibrous layers of arc-treated carbon felt Sigracell KFD2.5 EA manufactured by SGL Carbon Company, Germany). The felt was treated in an electric arc generally as previously described with reference to FIGS. 8 and 9. The felt before arc-treatment had a specific weight of 248 g/m², thickness of 2.5 mm, and carbon volume fraction ~7%. The material post arc-treatment had 217 g/m² specific weight, was 2.4 mm thick, and had ~6% carbon volume fraction.

The method of pasting for the single layer of felt is different to that described above for layers of woven fabric. Paste was prepared starting with 19.5 g of leady oxide (leady oxide batch purchased from Exide in 2009) to the same composition as set out in examples 1 and 2 above and followed the same mixing procedure in the ultrasound bath under same conditions. The carbon felt piece was placed on the plate which used for pasting. Then the above prepared paste was spread on the felt layer until a smooth distribution of paste on the surface was obtained. The felt piece was then placed on the ultra-sound vibration plate so that the unpasted surface faced up and paste was distributed on this surface using a flexible plastic spatula. Ultrasound vibration was on for ~50 sec during pasting. (Ultra-sound vibrating plate manufactured by Skymen Cleaning Equipment Shenzhen Co. Ltd was used, current rating on the US plate used was 1.75 A, the electrode was placed covering one transducer point on the plate). The pasted electrode was turned over couple of times while the ultra-sound was in operation until a smooth distribution of paste on surface appeared to have been achieved, but where the majority of the paste had penetrated into the felt.

The total amount of wet mass loaded in to the composite electrode was 19.5 g where the achieved capacity (low current discharging) was 2.4 Ah (i.e. 66% of the theoretical capacity).

The pasted electrode active area (pasted) dimensions were length 67.4 mm, width 45.6 mm, and thickness 2.44 mm. The achieved lead loading per volume (pasted density of the electrode based on the mass loaded on to the electrode) was 1.91 g/cm³. At the fully charged state of the electrode, active mass Pb to carbon volume ratio was 2.698. The average spacing between carbon fibres was about 36 microns.

Subsequently the electrode was air-dried, assembled in a cell, the cell was left soaking, and then formation charging was carried out in the cell, all as described in example 1.

Test Method(s) and Results:

The electrode was tested as described in examples 1 and 2 with the results set out in Table 2.

Example 4

Figure 12:
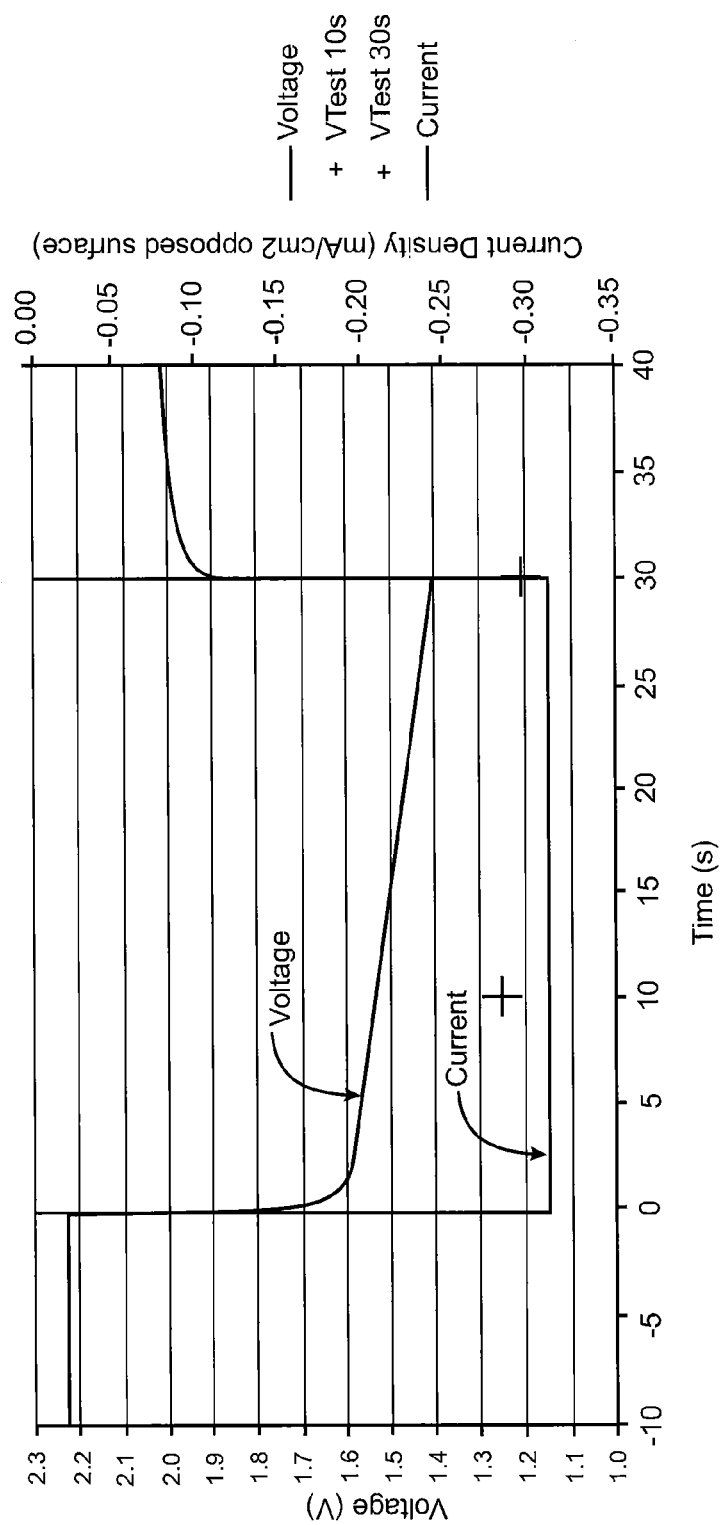
FIG. 12 shows the CCA performance of electrode N439 referred to in the subsequent description of experimental work, as tested using SAE J537 at a high rate of 310 mA/square cm of electrode surface area facing another electrode.

Non-Composite Electrode of Arc Treated Carbon Felt, Active Mass/Carbon Volume Ratio ~4.52—N439—See FIG. 12

Method:

An electrode was constructed of carbon fibrous layers of arc-treated carbon felt (Sigracell KFD2.5 EA) manufactured by SGL Carbon Company, Germany). The felt was treated in an electric arc generally as previously described with reference to FIGS. 8 and 9. The felt before arc-treatment had a specific weight of 248 g/m², thickness of 2.6 mm, and carbon volume fraction ~6%. The material post arc-treatment had 197 g/m² specific weight, was 2.33 mm thick, and had ~6% carbon volume fraction.

Lead coated Cu wires—0.38 mm in diameter were used as an additional current collector for the above electrode. These were laid on the felt surface manually along the length of the felt in a zig-zag manner with the vertical strips evenly spaced along the width, prior to injecting the lug. The lug was injected onto the felt so that the top of each zag of the Cu wire was immersed in the lug and attached to the lug.

Method of Pasting:

Paste was prepared with 23 g of leady oxide (leady oxide batch purchased from Exide in 2009), 1.5 g of diluted sulphuric acid, 0.023 g of Vanisperse A (expander) to achieve 0.1% expander in the paste and 0.184 g of barium sulphate. The same mixing procedure was followed for paste preparation and pasting as explained in previous examples of N363 and N364. Ultrasound vibration was on for ~1.30 min during pasting. (Ultra-sound vibrating plate manufactured by Skymen Cleaning Equipment Shenzhen Co. Ltd was used, current rating on the US plate used was 1.75 A, and the electrode was placed covering one transducer point on the plate). The pasted electrode was turned over a couple of times while the ultra-sound was in operation until a smooth distribution of paste on the surface was observed where the majority of paste had penetrated to the felt.

The total amount of wet mass loaded into the electrode was 24.62 g where the achieved capacity (low current discharging) was 3.077 Ah (i.e. 62% of the theoretical capacity). The pasted electrode active area (pasted) dimensions were, length 59 mm, width 45 mm, and thickness 2.7 mm. The achieved lead loading per volume (pasted density of the electrode based on the mass loaded into the electrode) was 2.63 g/cm³. At the fully charged state of the electrode, active mass Pb to carbon volume ratio is 4.52. The average spacing between carbon fibres was about 40 microns.

Subsequently the electrode was air-dried for 24 hours at ambient temperature (18° C.-24° C.) and then the pasted electrode was assembled in a cell containing electrolyte of 1.15 sg $H_2SO_4$ with one (40% SOC) positive electrode on each side. The cell was left soaking for 24 hours at ambient temperature (18° C.-24° C.). Then formation charging and stabilisation was carried out similarly as for example 1.

Tests and Results:

The cells were then transferred to carry out standard cranking tests (CCA) both at room temperature and −18° C. using the SAE J537 test as known in the industry.

Example 5

Figure 13:
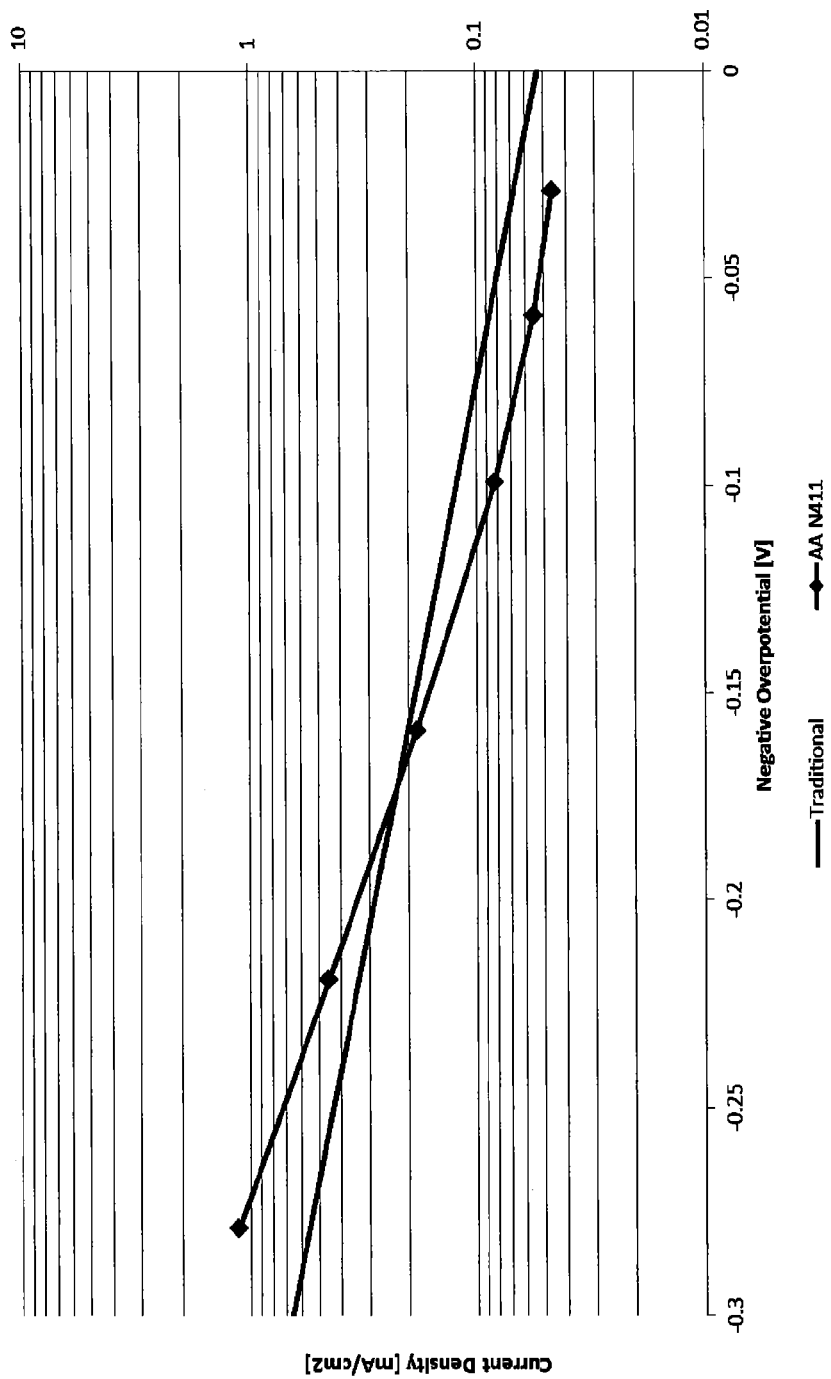
FIG. 13 shows the current versus charging overpotential (Tafel Line) of electrode 411 referred to in the subsequent description of experimental work, as compared to a traditional electrode, demonstrating similar water consumption properties.

Non-Composite Electrode of Arc Treated Carbon Felt with an Additional Current Collector of Lead Coated Copper Wires on Felt Surface (Approximately 1 m in Total Length) Active Mass/Carbon Volume Ratio ~3.63—N411—See FIGS. 1 and 13

Method:

An electrode was constructed of carbon fibrous layers of arc-treated carbon felt (Sigracell KFD2.5 EA manufactured by SGL Carbon Company, Germany). The felt was treated in an electric arc generally as previously described with reference to FIGS. 8 and 9. The felt before arc-treatment had a specific weight of 248 g/m², thickness of 2.5 mm, and carbon volume fraction ~7%. The material post arc-treatment had 190 g/m² specific weight, was 2.24 mm thick, and had ~6% carbon volume fraction.

Lead coated Cu wires of 0.38 mm in diameter were used as an additional current collector for the above electrode. These were laid on the felt surface manually along the length of the felt in a zig-zag manner where the vertical strips were evenly spaced along the width.

Preparation of paste and pasting was as described above for N363 except that an US time of 1 min 17 s was used.

The total amount of wet mass loaded in to the electrode was 17.08 g where the achieved capacity (low current discharging) was 2.15 Ah (i.e. 67.7% of the theoretical capacity). The pasted electrode active area (pasted) dimensions were, length 60.5 mm, width 44.1 mm, and thickness 3.6 mm. The achieved lead loading per volume (pasted density of the electrode based on the mass loaded on to the electrode) was 1.28 g/cm³. At the fully charged state of the electrode, active mass Pb to carbon volume ratio is 3.63. The average spacing between carbon fibres was about 40 microns.

Subsequently the electrode was air-dried for 24 hours at ambient temperature (18° C.-24° C.) and then the pasted electrode was assembled in a cell containing electrolyte of 1.15 sg $H_2SO_4$ with one (40% SOC) positive electrode on each side. The cell was left soaking for 24 hours at ambient temperature (18° C.-24° C.). Then formation charging and stabilisation was carried out similarly to example 1.

Tests and Results:

The cell was then transferred to do cranking ampere tests at room temperature prior to sending for water consumption testing (Tafel). The standard Tafel test is described in Fernandez, M., Atanassova, P., ALABC Project ref 1012M report no. 1, March-August 2011.

Example 6

Figure 14:
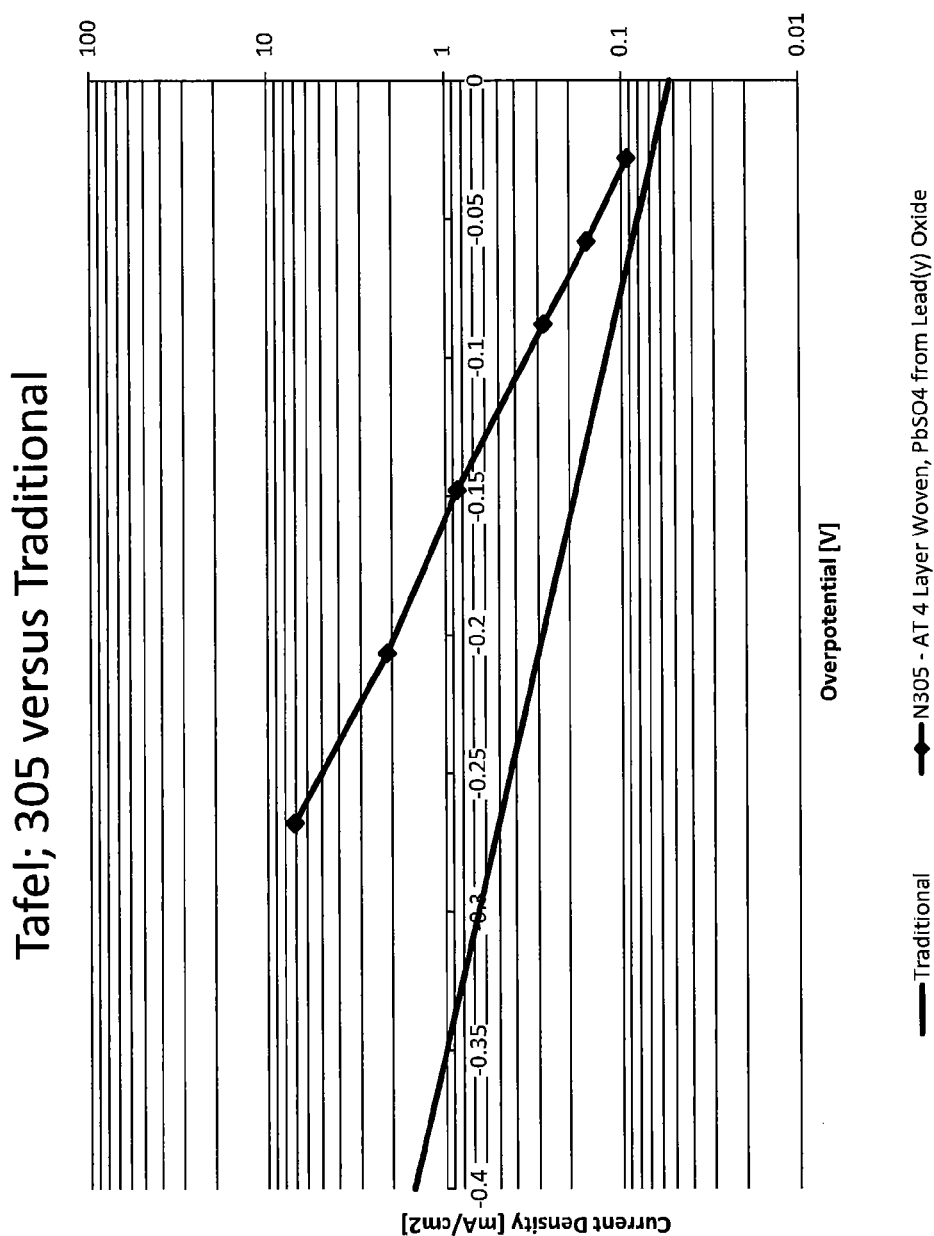
FIG. 14 shows the current versus charging overpotential (Tafel Line) of electrode 305 referred to in the subsequent description of experimental work, but is shows less desirable water consumption properties than a traditional electrode.

Non-Composite Electrode of Arc Treated Woven Carbon Fibre, Active Mass/Carbon Volume Ratio ~0.88—N305—See FIG. 14

Method:

An electrode was constructed of woven carbon fibre fabric PAN [polyacrylonitrite] based woven carbon fibre tape (manufactured by TaiCarbon, Taiwan). The fabric was treated in an electric arc generally as previously described with reference to FIGS. 8 and 9. This arc-treated fabric had 181 g/m² specific weight, was 0.58 mm thick, and had ~18.4% carbon volume fraction. Four pieces of the arc-treated fabric were cut into the size of 44 mm*70 mm.

Prior to arc treatment the material was fully wetted with $Pb(NO_3)_2$ aqueous solution, and dried overnight so that 2 mass % Pb was deposited.

Four such layers were then assembled one beneath the other so that they were all bonded to lead shim to form a connecting lug at one of their ends. 15 mm*44 mm pieces of solder flattened (50% Sn, 50% Pb) were placed in the three gaps between the four layers and also two on the two outer surfaces. A 25 mm wide ribbon of metallic lead (0.6 mm thick) was then wrapped around the outside of the ends of the four layers, covering the top 10 mm section of each layer. This construction was placed in a metallic box under inert air condition (box filled with nitrogen) and placed in an oven for ~1 hour under 200° C. The lead coverings were squeezed after taking out from the oven providing good contact between the carbon fibres and molten solder and lead. In this way, a lug was formed on the top end of the electrode, connecting and holding the carbon fabric layers that could be flexibly moved about for further treatment.

To make the active material, $PbSO_4$ powder (mean size 4-5 μm after milling) was mixed in with low concentration sulphuric acid (s.g. <1.05) to make a paste of 77.3 mass % $PbSO_4$. The above lug was placed on a flat plate. The lug was placed on the pasting plate holding the top three layers up from the plate while the fourth lay flat on the plate. Paste was applied on the fourth layer on the flat plate. The next layer was then released onto the first layer. Paste was distributed on the surface of the second layer until achieving a smooth surface. The above procedure was repeated for the next two layers. Then the whole construction was turned over on the plate which was then vibrated with ultrasound, which caused the paste to penetrate and distribute evenly until all the fibre spaces were filled up. This was achieved during an ultrasound period of around 30 s.

The total amount of wet mass loaded in to the electrode was 15.6 g where the achieved capacity (low current discharging) was 2.33 Ah (i.e. 62% of the theoretical capacity).

The pasted electrode active area (pasted) dimensions were length 61 mm, width 44.7 mm, and thickness 2.22 mm. The achieved lead loading per volume (pasted density of the electrode based on the mass loaded on to the electrode) was 1.402 g/cm³. At the fully charged state of the electrode, active mass Pb to carbon volume ratio is 0.88. The average spacing between carbon fibres was about 17 microns.

Subsequently the electrode was air-dried for 24 hours at ambient temperature (18° C.-24° C.) and then the pasted electrode was assembled in a cell containing electrolyte of 1.15 sg $H_2SO_4$ with one (40% SOC) positive electrode on each side. The cell was left soaking for 24 hours at ambient temperature (18° C.-24° C.). Then formation charging and stabilisation was carried out similarly to example 1.

Tests and Results:

The cell was then transferred to do cranking ampere tests at room temperature prior to sending for water consumption testing (Tafel) as for electrode 411. The standard Tafel test is described in Fernandez, M., Atanassova, P., ALABC Project ref 1012M report no. 1, March-August 2011.

Example 7

Figure 16:
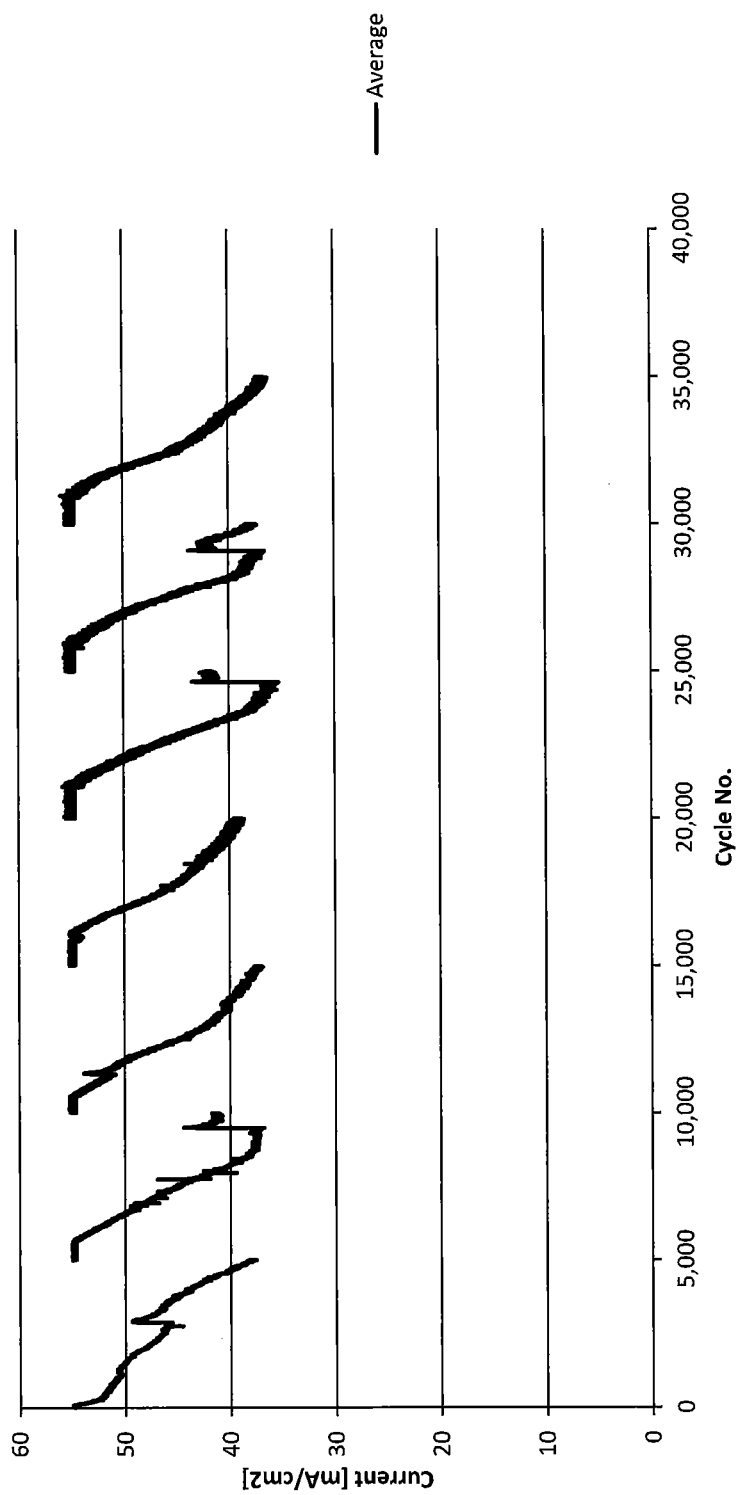
FIG. 16 shows the High Rate DCA performance of electrode 356 while 60 mm long, with no wire current collector, referred to in the subsequent description of experimental work, which has DCA performance less than an electrode with a wire current collector, but still better than a traditional electrode.
Figure 17:
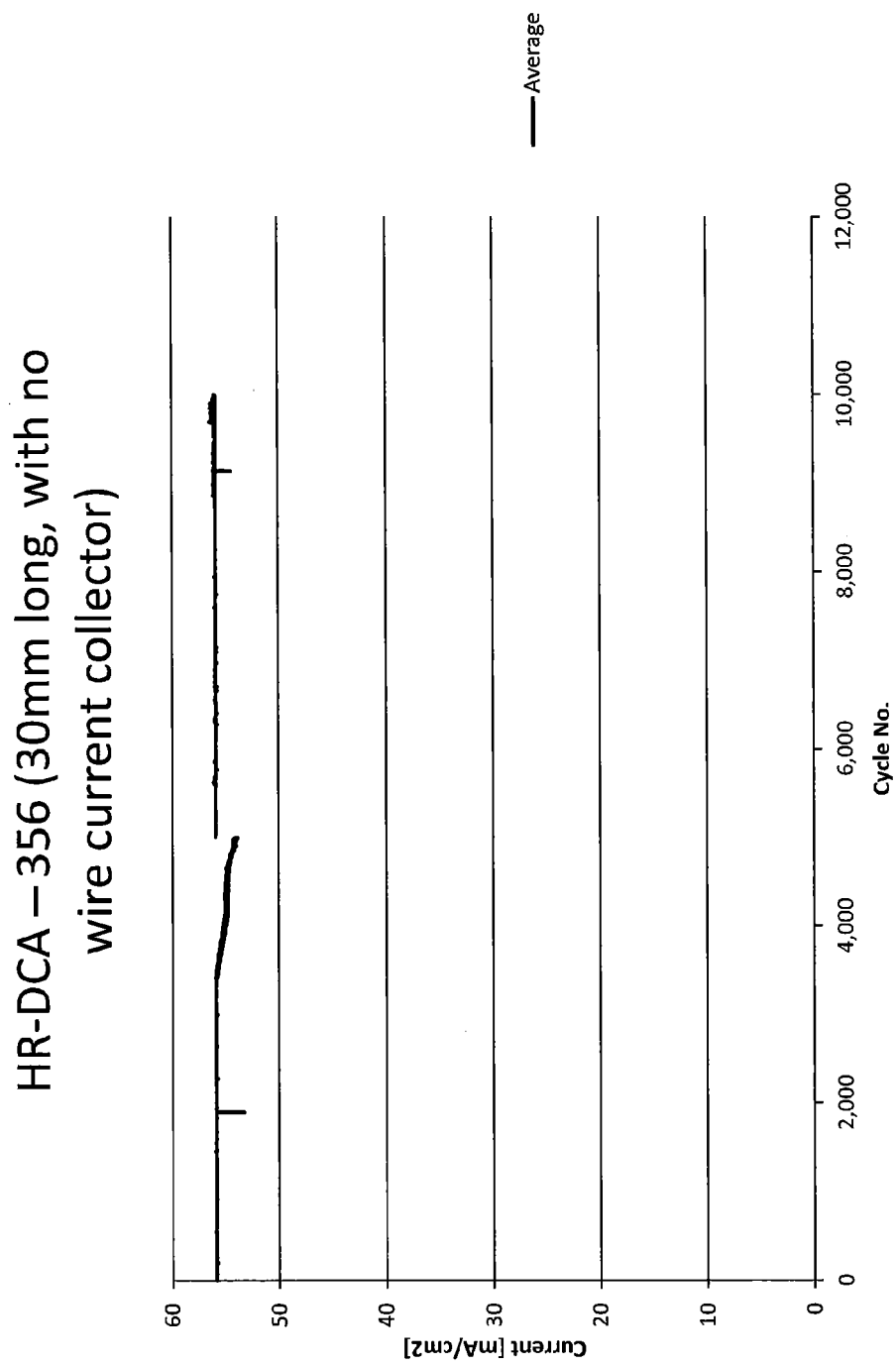
FIG. 17 shows the High Rate DCA performance for electrode 356 referred to in the subsequent description of experimental work, after the initial 35,000 cycles (shown in FIG. 16) and reduced in length to 30 mm, and then tested at the same charging current density as before, and shows exceptional DCA performance.

Non-Composite Electrode of Arc Treated Carbon Felt, Active Mass/Carbon Volume Ratio ~2.63—N356—See FIG. 16

Method:

An electrode was constructed of carbon fibrous layers of arc-treated carbon felt (Sigracell KFD2.5 EA manufactured by SGL Carbon Company, Germany). The felt was treated in an electric arc generally as previously described with reference to FIGS. 7 and 8. The felt before arc-treatment had a specific weight of 248 g/m², thickness of 2.5 mm, and carbon volume fraction ~7%. The material post arc-treatment had 217 g/m² specific weight, was 2.47 mm thick, and had ~6.3% carbon volume fraction.

Preparation of paste and pasting was as described above for N363 except that an US time of 1 min 26 s was used.

The total amount of mass loaded in to the electrode was 15.60 g where the achieved capacity (low current discharging) was 1.93 Ah (i.e. 67% of the theoretical capacity). The electrode active area (pasted) dimensions were, length 61.02 mm, width 44.77 mm, and thickness 2.34 mm. The achieved lead loading per volume (pasted density of the electrode based on the mass loaded on to the electrode) was 1.75 g/cm³. At the fully charged state of the electrode, active mass Pb to carbon volume ratio is 2.63. The average spacing between carbon fibres was about 37 microns.

Subsequently the electrode was air-dried for 24 hours at ambient temperature (18° C.-24° C.) and then the pasted electrode was assembled in a cell containing electrolyte of 1.15 sg $H_2SO_4$ with one (40% SOC) positive electrode on each side. The cell was left soaking for 24 hours at ambient temperature (18° C.-24° C.). Then formation charging and stabilisation was carried out similarly to example 1.

Tests and Results:

The cell was then transferred to do cranking ampere tests at both room temperature and −18 C prior to being sent for HR-DCAT testing. The results are shown in table 2 and FIG. 16.

Example 8

Non-Composite Electrode of Arc Treated Carbon Felt, Active Mass/Carbon Volume Ratio ~3.68—N409

Method:

An electrode was constructed of carbon fibrous layers of arc-treated carbon felt (Sigracell KFD2.5 EA manufactured by SGL Carbon Company, Germany). The felt was treated in an electric arc generally as previously described with reference to FIGS. 8 and 9. The felt before arc-treatment had a specific weight of 248 g/m$^2$, thickness of 2.5 mm, and carbon volume fraction ~7%. The material post arc-treatment had 183 g/m$^2$ specific weight, was 1.98 mm thick, and had ~6.6% carbon volume fraction.

Lead coated copper wires of 0.38 mm in diameter were used as an additional current collector for the above electrode. These were laid on the felt surface manually along the length of the felt in a zig-zag manner so that the vertical strips were evenly spaced along the width prior to injecting the lug. The lug was injected onto the felt in a manner that the top (zag) of each line of the wire attached to the lug.

Preparation of paste and pasting was as described above for N363 except that an US time of 1 min 10 s was used.

The total amount of wet mass loaded in to the electrode was 17.79 g where the achieved capacity (low current discharging) was 2.03 Ah (i.e. 61% of the theoretical capacity). The electrode active area (pasted) dimensions were, length 63.5 mm, width 44.85 mm, and thickness 2.71 mm. The achieved lead loading per volume (pasted density of the electrode based on the mass loaded on to the electrode) was 1.66 g/cm$^3$. At the fully charged state of the electrode, active mass Pb to carbon volume ratio is 3.68. The average spacing between carbon fibres was about 45 microns. Subsequently the electrode was air-dried for 24 hours at ambient temperature (18° C.-24° C.) and then the pasted electrode was assembled in a cell containing electrolyte of 1.15 sg $H_2SO_4$ with one (40% SOC) positive electrode on each side. The cell was left soaking for 24 hours at ambient temperature (18° C.-24° C.). Then formation charging and stabilisation was carried out similarly to example 1.

Tests and Results:—

Figure 15:
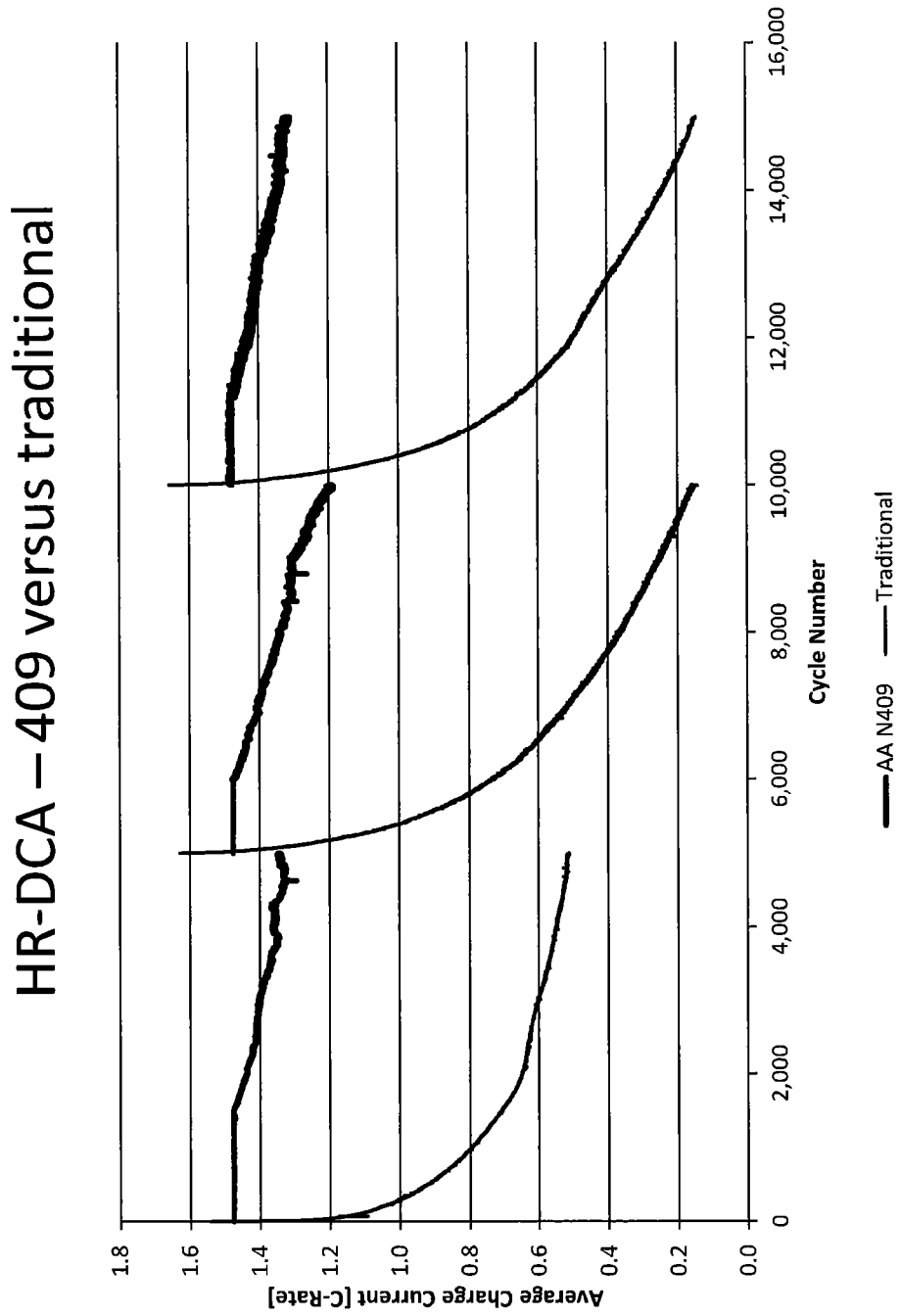
FIG. 15 shows the High Rate DCA performance of electrode 409, a 60 mm long electrode with a wire current collector, referred to in the subsequent description of experimental work, which demonstrates good DCA performance compared to a traditional electrode.

The cells were then transferred to test for standard cranking test at room temperature prior to sending for HR-DCAT testing. The results are set out in table 2 and FIG. 15.

Example 9

Figure 18:
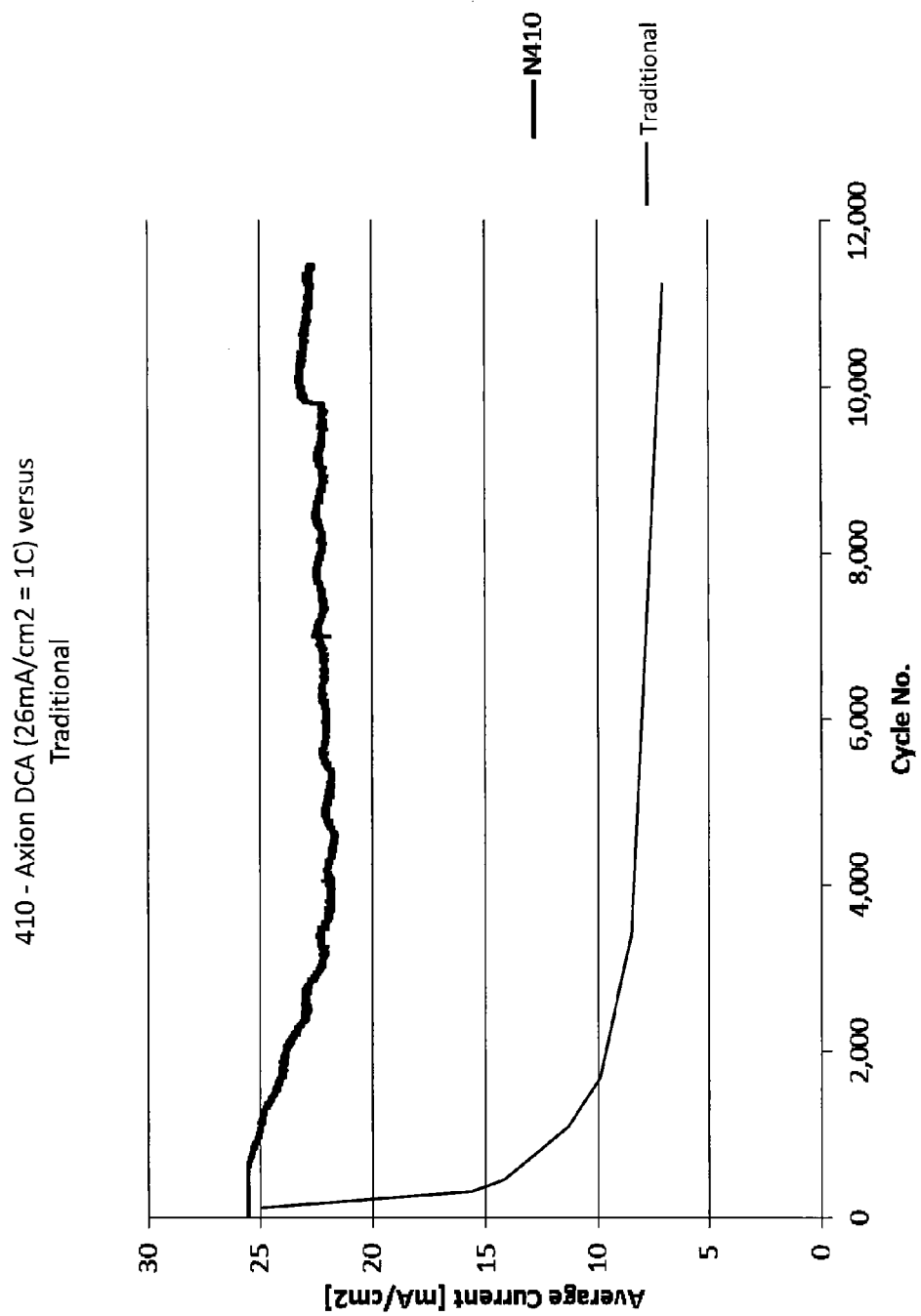
FIG. 18 shows the DCA performance of electrode 410 when using the Axion DCA test, as compared to the typical DCA performance of a traditional lead acid Battery.

Non-Composite Electrode of Arc Treated Carbon Felt with an Additional Current Collector of Lead Coated Copper Wires on Felt Surface (Approximately 1 m in Total Length), Active Mass/Carbon Volume Ratio ~3.797—N410—See FIG. 18

Method:

An electrode was constructed of carbon fibrous layers of arc-treated carbon felt (Sigracell KFD2.5 EA manufactured by SGL Carbon Company, Germany). The felt was treated in an electric arc generally as previously described with reference to FIGS. 8 and 9. The felt before arc-treatment had a specific weight of 248 g/m$^2$, thickness of 2.5 mm, and carbon volume fraction ~7.1%. The material post arc-treatment had 183 g/m$^2$ specific weight, was 1.98 mm thick, and had ~6.6% carbon volume fraction.

Lead coated copper wires of 0.38 mm in diameter were used as an additional current collector for the above electrode. These were laid on the felt surface manually along the length of the felt in a zig-zag manner where the vertical strips were evenly spaced along the width prior to injecting the lug. The lug was injected into the felt in a manner that the top of each zag of the Cu wire attached to the lug.

Preparation of paste and pasting was as described above for N363 except that an US time of 1 min 11 s was used.

The total amount of wet mass loaded in to the electrode was 17.66 g where the achieved capacity (low current discharging) was 2.11 Ah (i.e. 64.4% of the theoretical capacity). The pasted electrode active area (pasted) dimensions were, length 61.71 mm, width 44.34 mm, and thickness 2.78 mm. The achieved lead loading per volume (pasted density of the electrode based on the mass loaded on to the electrode) was 1.67 g/cm$^3$. At the fully charged state of the electrode, active mass Pb to carbon volume ratio is 3.797. The average spacing between carbon fibres was about 45 microns.

Subsequently the electrode was air-dried for 24 hours at ambient temperature (18° C.-24° C.) and then the pasted electrode was assembled in a cell containing electrolyte of 1.15 sg $H_2SO_4$ with one (40% SOC) positive electrode on each side. The cell was left soaking for 24 hours at ambient temperature (18° C.-24° C.). Then formation charging and stabilisation was carried out similarly to example 1.

Tests and Results:

The cells were transferred to submit them to standard cranking test at room temperature prior to sending for Axion-DCA testing.

Example 10

Non-Composite Electrode of Arc Treated Carbon Felt (Thickness ~1.3 mm) with an Additional Current Collector of Lead Coated Copper Wires on Felt Surface (Approximately 1 m in Total Length), Active Mass/Carbon Volume Ratio ~4.893—N441—See FIG. 1

This electrode was constructed with carbon fibrous layers using arc-treated felt JX-PCF, manufactured by Heilongjiang J&X Co., Ltd. China. The felt had a specific weight of 508 g/m$^2$, thickness of 4 mm and carbon volume fraction ~7.5%. The material was splitted in to a thinner strip (manually cutting using a sharp blade) and arc-treated as explained in previous examples. Post arc-treatment had 144 g/m² specific weight, was 1.3 mm thick, and had ~6.4% carbon volume fraction.

Lead coated Cu wires—0.38 mm in diameter were used as an additional current collector for the above electrode. These were laid on the felt surface manually along the length of the felt in a zig-zag manner with the vertical strips evenly spaced along the width, prior to putting a lug on. The lug was prepared for this electrode in the same manner as explained in the example 5 above using solder (50% Sn and 50% Pb) making sure that top of each zag of the Cu wire was immersed in the lug and attached to the lug.

Preparation of paste and pasting was as described above for N363 except that an US time of 1 min 48 s was used.

The total amount of wet mass loaded into the electrode was 16.11 g where the achieved capacity (low current discharging) was 2.052 Ah (i.e. 63% of the theoretical capacity). The pasted electrode active area (pasted) dimensions were, length 59.8 mm, width 44.9 mm, and thickness 1.78 mm. The achieved lead loading per volume (pasted density of the electrode based on the mass loaded into the electrode) was 2.64 g/cm³. At the fully charged state of the electrode, active mass Pb to carbon volume ratio is 4.893. The average spacing between carbon fibres was about 23 microns.

carbon volume fraction ~7%. The material post arc-treatment had 203 g/m² specific weight, was 2.25 mm thick, and had ~6.4% carbon volume fraction.

Preparation of paste and pasting was as described above for N363 except that the Vanisperse A™ solution was prepared in order to achieve 0.07% in mass of Vanisperse A™ in the final paste and an US time of 1 min 23 s was used.

The total amount of wet mass loaded in to the electrode was 14.2 g where the achieved capacity (low current discharging) was 1.68 Ah (i.e. 64% of the theoretical capacity).

The pasted electrode active area (pasted) dimensions were length 67.4 mm, width 44.8 mm, and thickness 2.46 mm. The achieved lead loading per volume (pasted density of the electrode based on the mass loaded on to the electrode) was 1.38 g/cm³. At the fully charged state of the electrode, active mass Pb to carbon volume ratio was 2.53. The average spacing between carbon fibres was about 39 microns.

Subsequently the electrode was air-dried, assembled in a cell, the cell was left soaking, and then formation charging was carried out in the cell, all as described in example 1. Then the cell was transferred to carry out the standard cranking ampere tests on room temperature and −18° C.

TABLE 2

| Electrode | Electrode material | NAM loaded (gm) | Pb loading per vol (gm/cm3) | Vol fraction of C | Vol fraction of Pb | Electrode voidage | Pb:C vol fraction | Utilization % of discharged capacity on theoretical capacity based on NAM loaded | |
|---|---|---|---|---|---|---|---|---|---|
| | | | | | | | | $1^{st}$ Discharge | $2^{nd}$ Discharge |
| N356 | Felt arc treated | 15.60 | 1.75 | 0.06 | 0.16 | 0.79 | 2.63 | 72 (2.09 Ah) | 67 (1.93 Ah) |
| N363 | Felt arc treated | 19.50 | 1.91 | 0.06 | 0.17 | 0.77 | 2.70 | 72 (2.60 Ah) | 66 (2.39 Ah) |
| N349 | Woven - arc-treated | 14.87 | 1.72 | 0.18 | 0.15 | 0.67 | 0.83 | 69 (1.91 Ah) | 60 (1.65 Ah) |
| N439 | Felt arc treated | 24.62 | 2.63 | 0.05 | 0.23 | 0.72 | 4.52 | 67 (3.35 Ah) | 62 (3.08 Ah) |
| N305 | Woven - arc-treated | 15.58 | 1.36 | 0.19 | 0.17 | 0.64 | 0.88 | 67 (1.43 Ah) | 55 (1.2 Ah) |
| N409 | Felt arc treated | 17.79 | 1.66 | 0.04 | 0.15 | 0.81 | 3.68 | 65 (2.1 Ah) | 61 (2.03 Ah) |
| N410 | Felt arc treated | 17.66 | 1.67 | 0.04 | 0.15 | 0.81 | 3.797 | 72 (2.36 Ah) | 64 (2.11 Ah) |
| N411 | Felt arc treated | 17.68 | 1.33 | 0.03 | 0.11 | 0.86 | 3.63 | 74 (2.44 Ah) | 65 (2.15 Ah) |
| N441 | Felt arc treated | 16.11 | 2.64 | 0.05 | 0.23 | 0.72 | 4.893 | 65 (2.12 Ah) | 63 (2.05 Ah) |

Example 11

Non-Composite Electrode of Arc Treated Carbon Felt, Active Mass/Carbon Volume Ratio ~2.53—N387

Method:

An electrode was constructed of carbon fibrous layers of arc-treated carbon felt Sigracell KFD2.5 EA manufactured by SGL Carbon Company, Germany). The felt was treated in an electric arc generally as previously described with reference to FIGS. 8 and 9. The felt before arc-treatment had a specific weight of 248 g/m², thickness of 2.5 mm, and Example 12

Non-Composite Electrode of Arc Treated Carbon Felt, Active Mass/Carbon Volume Ratio ~2.696—N392

Method:

An electrode was constructed of carbon fibrous layers of arc-treated carbon felt Sigracell KFD2.5 EA manufactured by SGL Carbon Company, Germany). The felt was treated in an electric arc generally as previously described with reference to FIGS. 8 and 9. The felt before arc-treatment had a specific weight of 248 g/m², thickness of 2.5 mm, and carbon volume fraction ~7%. The material post arc-treatment had 203 g/m² specific weight, was 2.25 mm thick, and had ~6.4% carbon volume fraction.

Preparation of paste and pasting was as described above for N363 except that the Vanisperse A™ solution was prepared in order to achieve 0.25% in mass of Vanisperse A™ in the final paste and an US time of 1 min 23 s was used.

The total amount of wet mass loaded in to the electrode was 15.33 g where the achieved capacity (low current discharging) was 1.83 Ah (i.e. 64% of the theoretical capacity).

Example 13

Amount of Sulphuric Acid Used in Paste

A small batch of paste made up of a suspension of particles of lead monoxide (97 mass %) and lead (3%) together with water, and increasing amounts of acid were added. The 13.0 g of solid was suspended in 3.65 g of water, achieving a solids mass fraction of 78% and volume fraction of around 27%. This was a freely settling slurry, difficult to keep uniformly suspended, and difficult to evenly spread onto a felt layer. Vibration (ultrasound) did not improve the properties and did not bring about easy penetration. The pH of the liquid in equilibrium with the solids was 10. Small amounts of acid were added to bring the acid to around 0.12 mass % when a slight creaminess was observed, and the pH was around 9 to 9.5. A further addition to 0.5% resulted in a creamy paste and a pH of 8.5 to 9. Addition of further acid brought the pH down to a buffered 8.0.

Several separate mixes were then made with the same solids fraction as above, and dispersion and penetration through felt via ultrasound was attempted for succeeding higher acid concentrations. At 0.24 mass % acid, there was little stability of the paste mass on a spatula, but the paste penetrated well (some appeared at the other side of a 2.3 mm thick felt). The optimum acid addition was around 1.0% when both penetration and high loading of the felt was possible. As the acid was increased the paste became stiffer with paste at 2.28% being able to be pasted with a spatula but much of it remained on the outside of the felt layer after ultrasound with poor penetration and rapid drying.

The foregoing describes the invention including preferred forms thereof and alterations and modifications as will be obvious to one skilled in the art are intended to be incorporated within the scope hereof as defined in the accompanying claims.

The invention claimed is:

1. A lead-acid battery or cell including at least one (non-composite or composite) electrode comprising as a current collector a conductive fibre material comprising, when fully charged, voidage (being the fractional volume occupied by pores between the lead and conductive fibres) of at least about 0.3, and a mass loading ratio of lead to the mass of conductive fibres, when converted to volume ratio, in the range above 0.7:1 to about 15:1 (each over at least a major fraction of the electrode).

2. A lead-acid battery or cell according to claim 1 including at least one electrode comprising as a current collector a conductive fibre material comprising, when fully charged, voidage between about 0.3 and about 0.9.

3. A lead-acid battery or cell according to claim 1 wherein the average interfibre spacing between fibres in the conductive fibre material is between about 0.5 and about 10 average fibre diameters.

4. A lead-acid battery or cell according to claim 1 wherein the conductive fibre material comprises a carbon fibre material.

5. A lead-acid battery or cell according to claim 4 wherein the carbon fibre material comprises a woven or a non-woven carbon fibre material.

6. A lead-acid battery or cell according to claim 4 wherein the carbon fibre material has been thermally treated by electric arc discharge.

7. A lead-acid battery or cell according to claim 1 wherein conducting chains of Pb-based particles attached to the conductive fibre material have been formed by impregnating a paste comprising Pb-based particles, sulphuric acid, and water into the conductive fibre material and passing a formation current through the electrode.

8. A lead-acid battery or cell according to claim 7 wherein the Pb-based particles comprises predominantly Pb and PbO particles.

9. A lead-acid battery or cell according to claim 7 wherein the dilute sulphuric acid in the paste comprises between greater than 0% and about 5% by weight of sulphuric acid.

10. A lead-acid battery or cell according to claim 7 wherein the average particle size of Pb-based particles in the paste at impregnation is less than 10 microns.

11. A lead-acid battery or cell according to claim 7 wherein the paste also comprises an expander.

12. A lead-acid battery or cell according to claim 11 wherein the expander comprises a lignosulfonate.

13. A lead-acid battery or cell according to claim 1 wherein the electrode comprises a metal lug for external connection along at least one edge.

14. A lead-acid battery or cell according to claim 13 wherein the electrode comprises on one or both sides of the conductive fibrous material a macro-scale metal conductor electrically conductively attached to the conductive fibrous material and to the lug, or comprises two layers of conductive fibrous material with a macro-scale metal conductor electrically conductively between and attached to the conductive fibrous material and to the lug.

15. A hybrid automotive vehicle comprising a battery according to claim 1.

16. A lead-acid battery or cell according to claim 1 wherein the carbon fibre material has length and width dimensions in a major plane of the material and a average thickness perpendicular to said major plane of the material less than 5 mm.

17. A lead-acid battery or cell including at least one (non-composite or composite) electrode comprising as a current collector a conductive fibre material comprising, when fully charged, voidage (being the fractional volume occupied by pores between the lead and conductive fibres) of at least about 0.3, and a mass loading ratio of lead to the mass of conductive fibres, when converted to volume ratio, in the range about 1:1 to about 10:1 (each over at least a major fraction of the electrode).

* * * * *